Sept. 28, 1948.  J. F. MURPHY  2,450,249
AUTOMATIC PIN SETTING MACHINE
Filed April 13, 1943  21 Sheets-Sheet 2
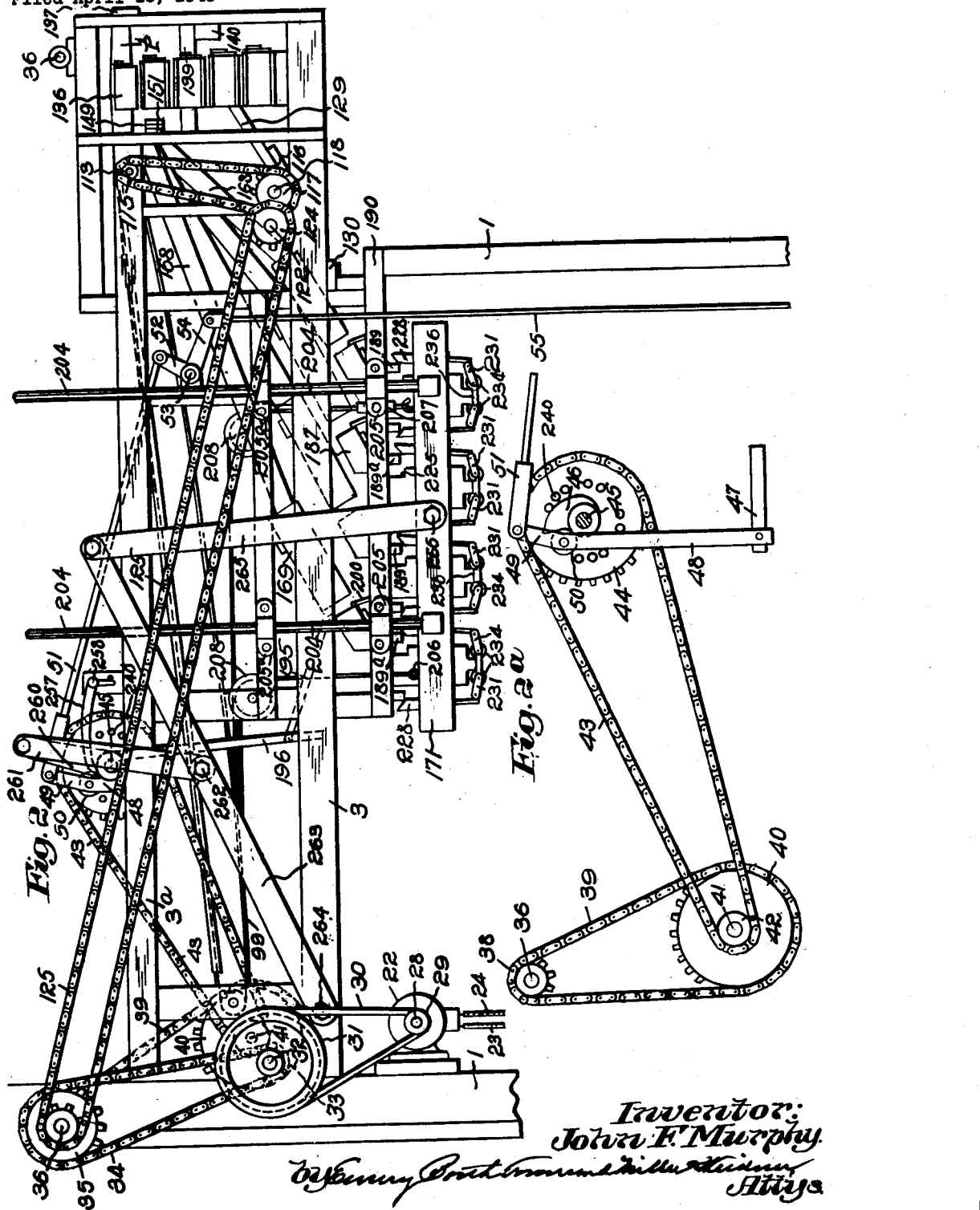
Inventor:
John F. Murphy
Attys.

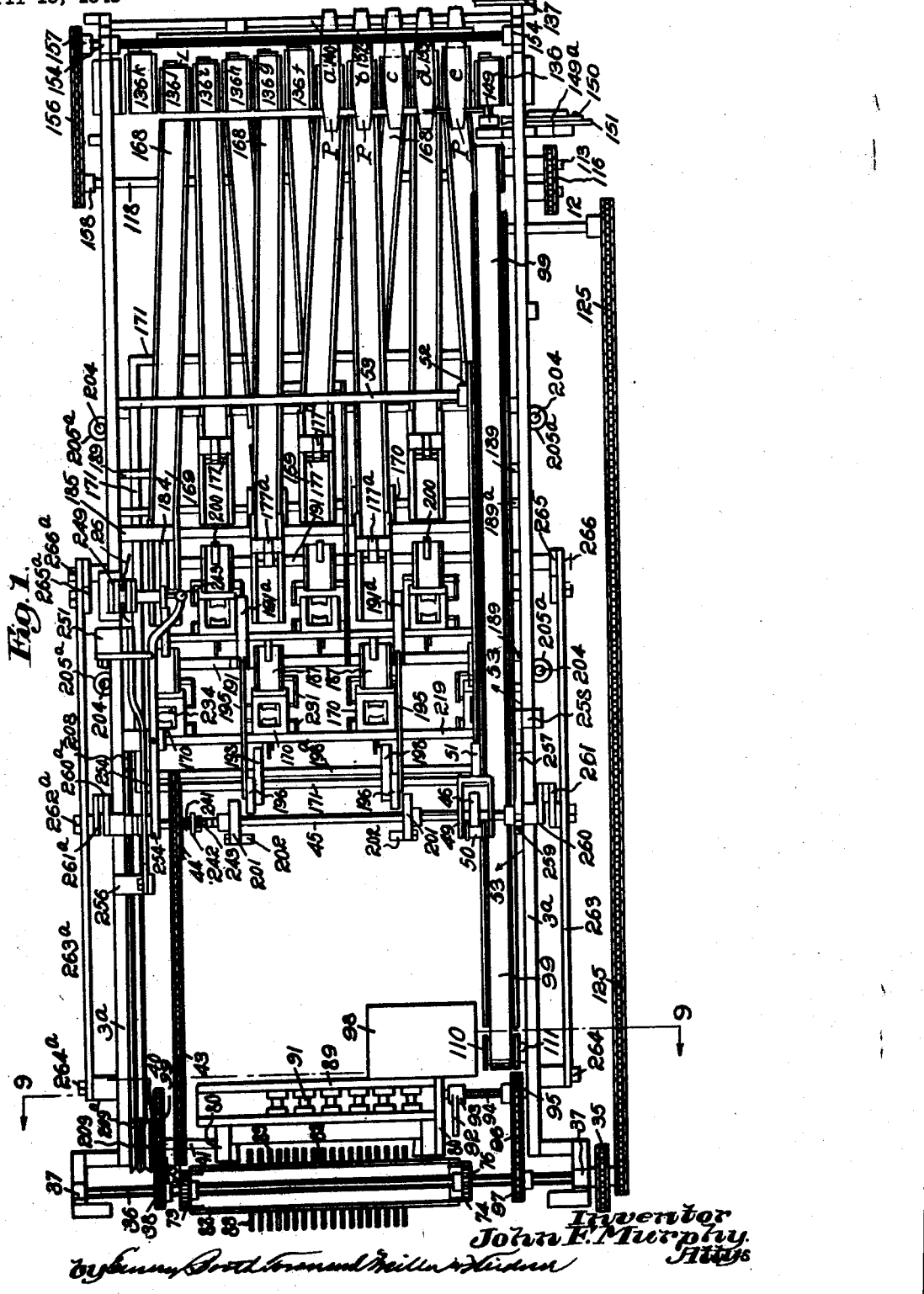

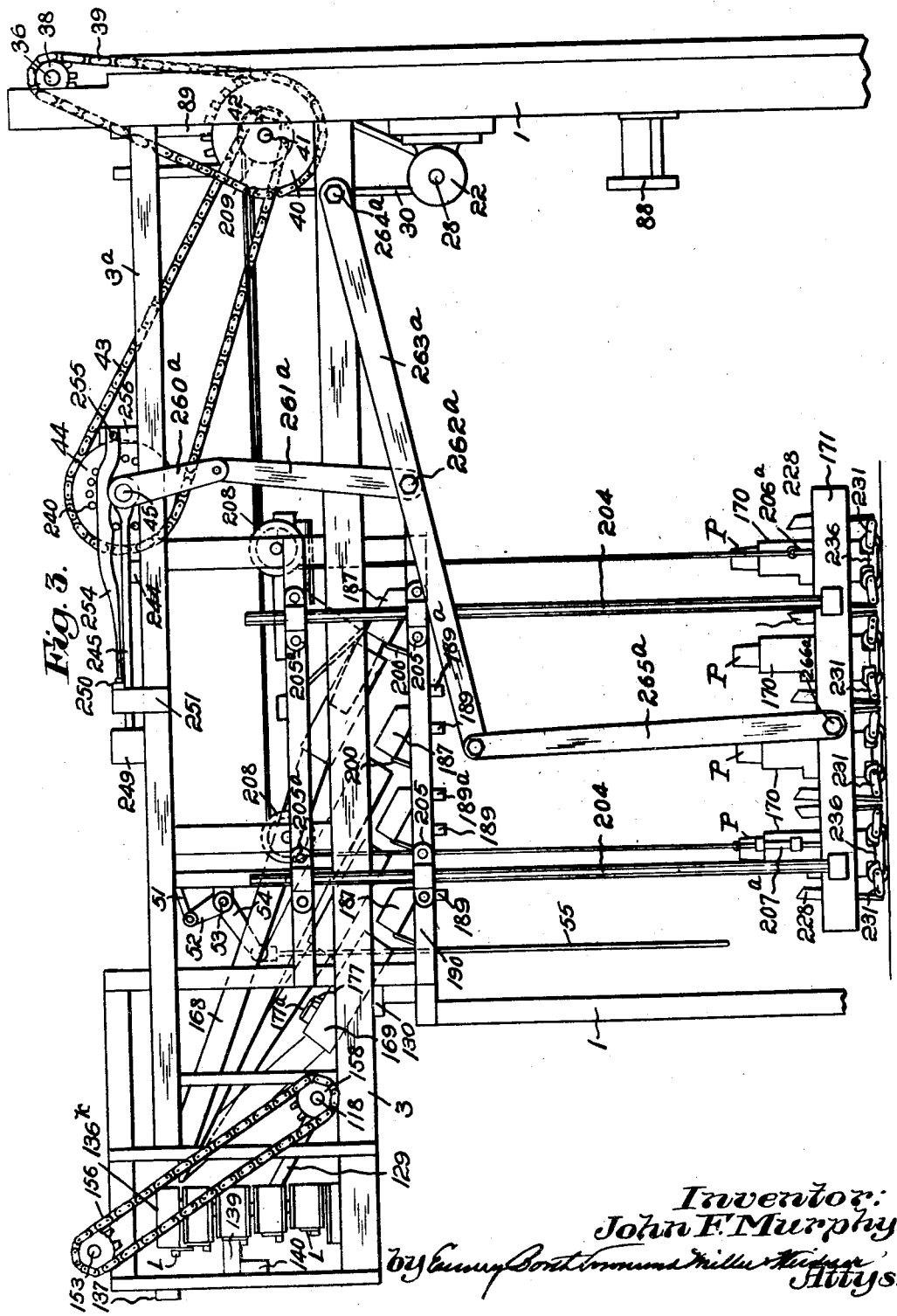

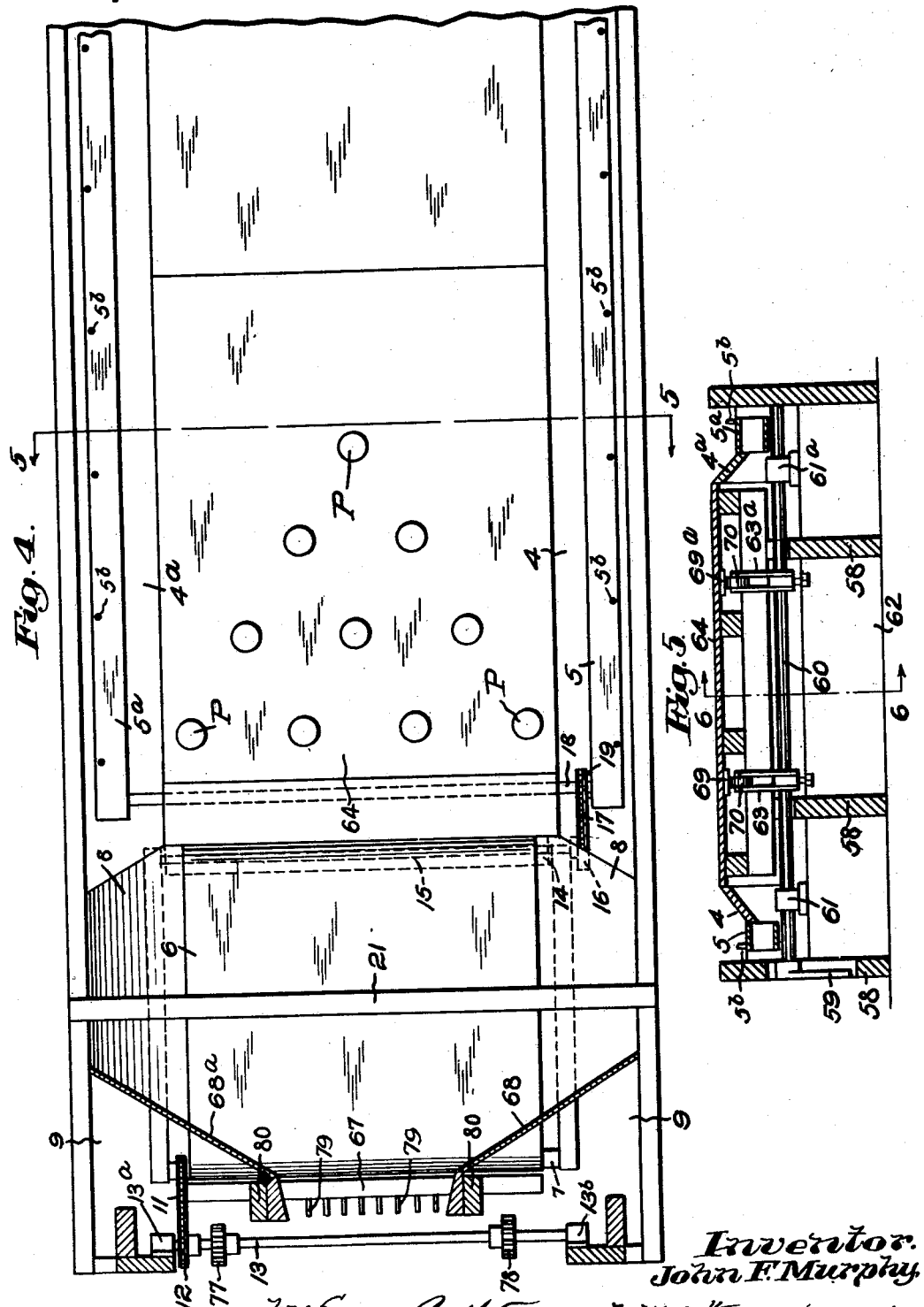

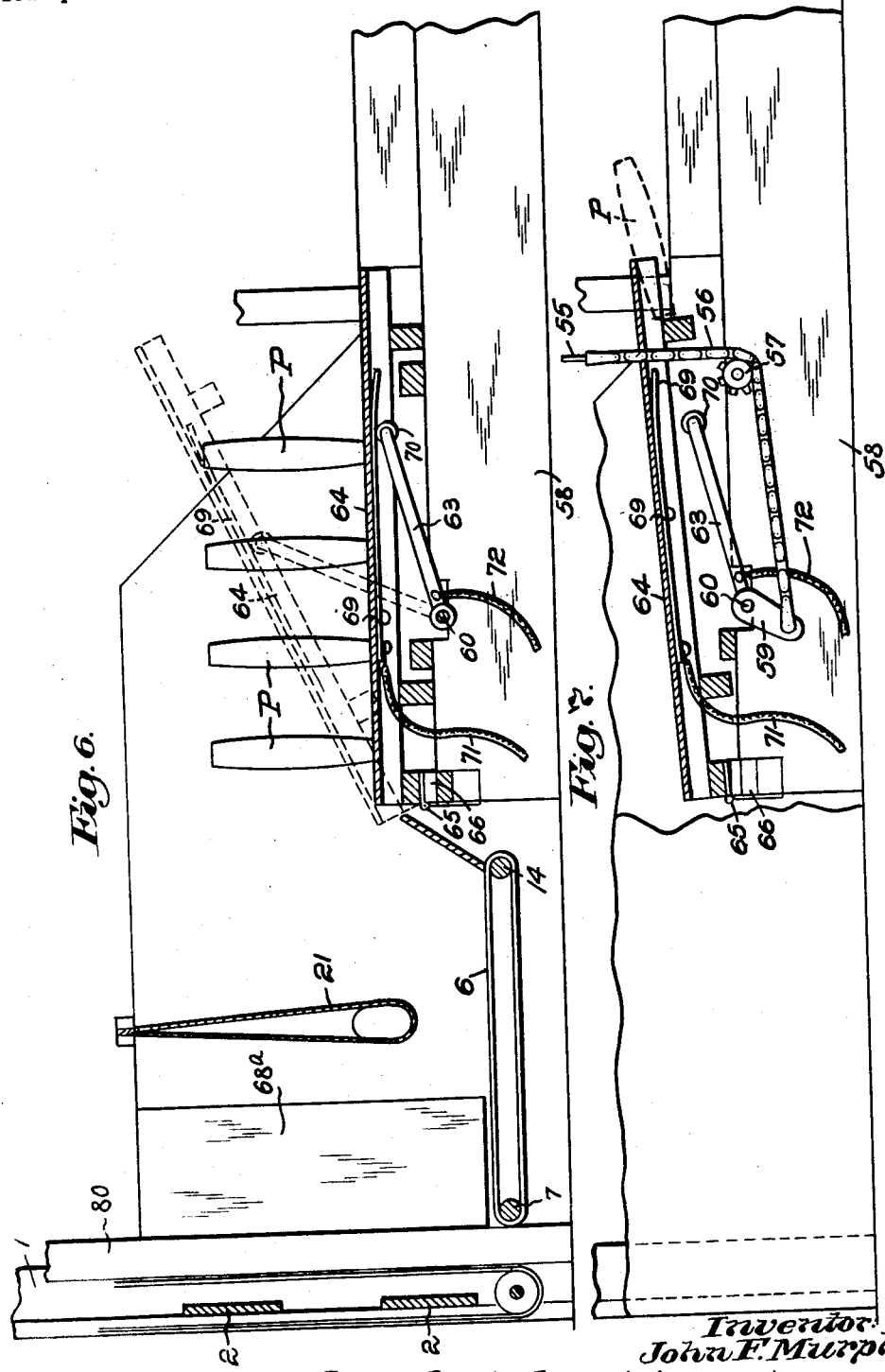

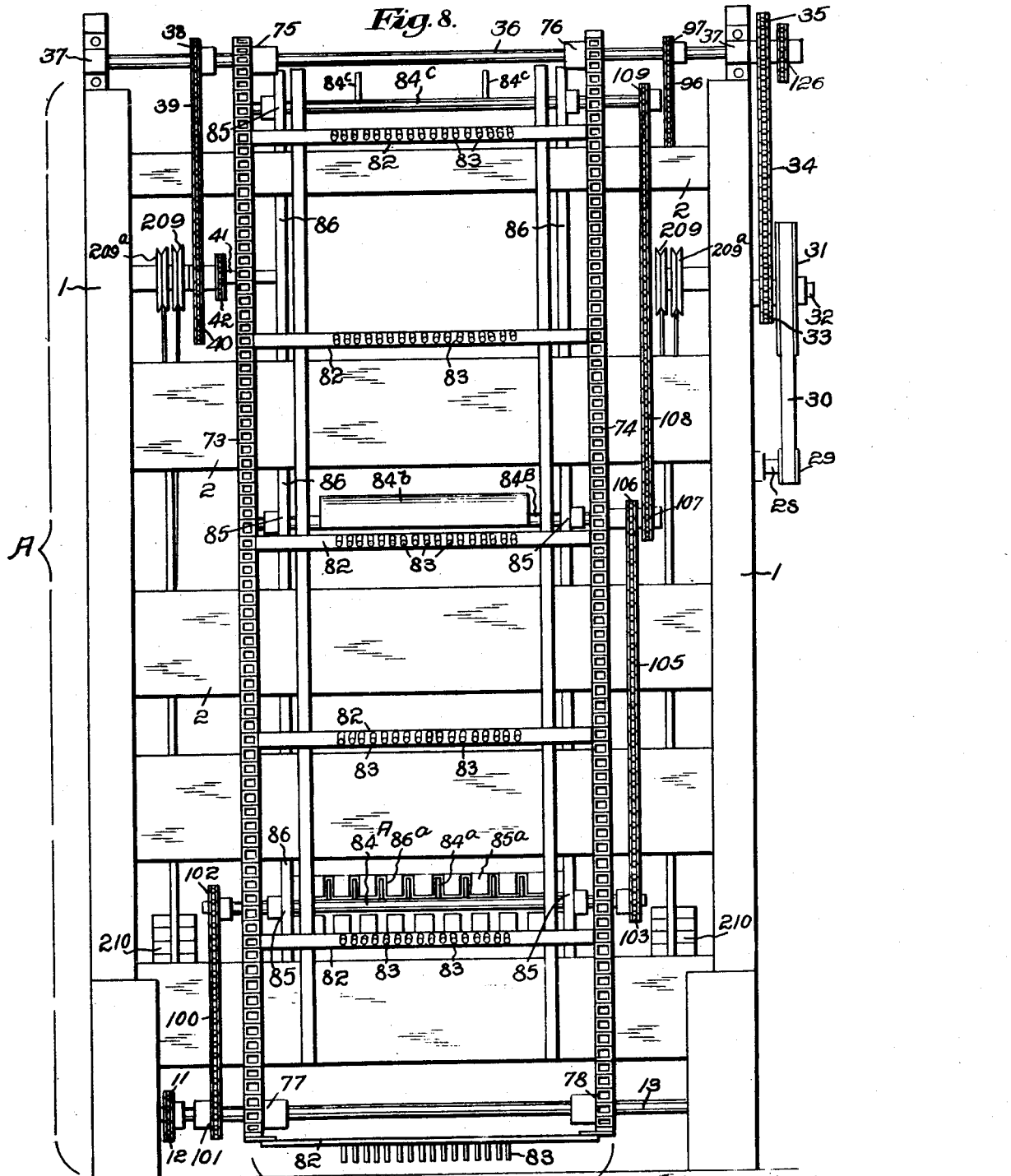

Sept. 28, 1948.    J. F. MURPHY    2,450,249
AUTOMATIC PIN SETTING MACHINE
Filed April 13, 1943    21 Sheets-Sheet 7
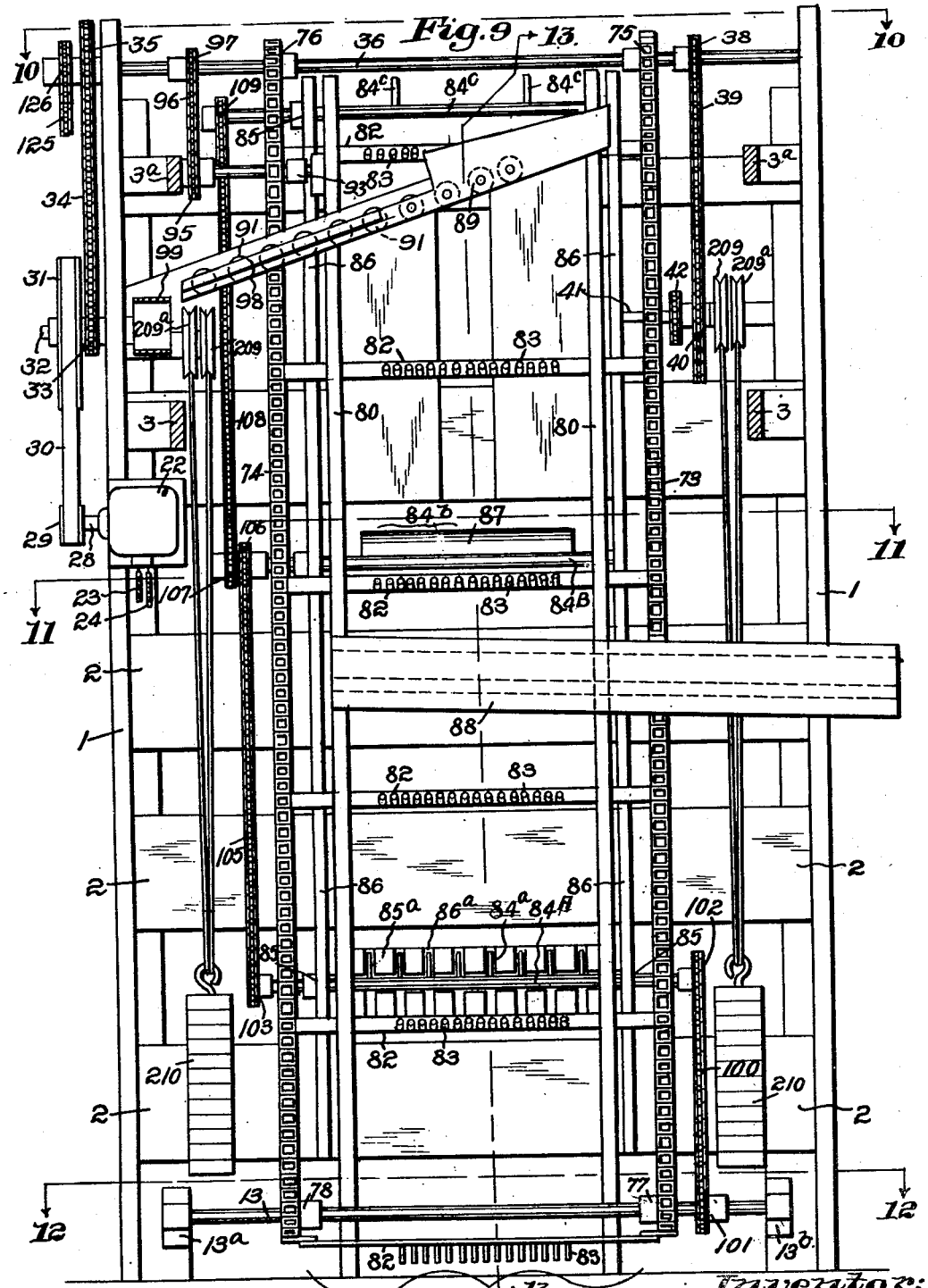

Sept. 28, 1948.　　　　J. F. MURPHY　　　2,450,249
AUTOMATIC PIN SETTING MACHINE
Filed April 13, 1943　　　　　　　　　21 Sheets-Sheet 8
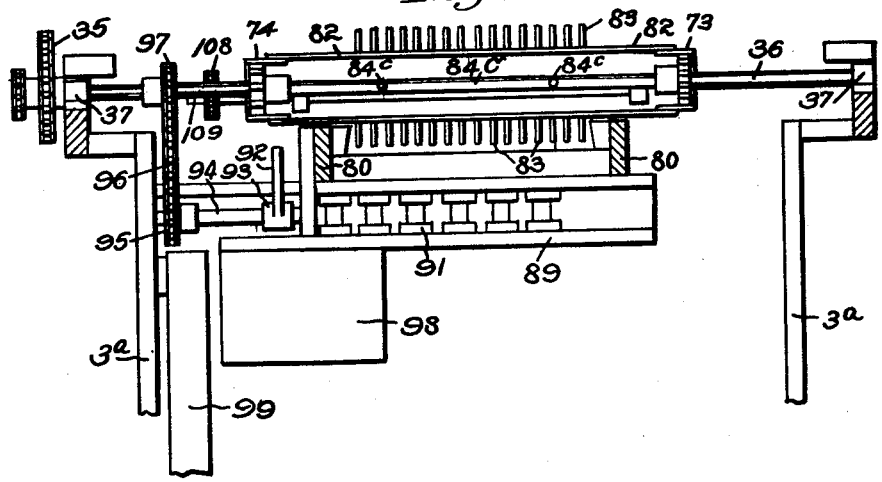
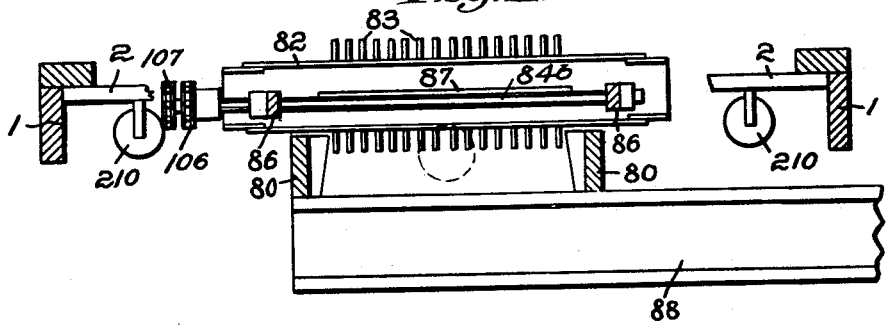
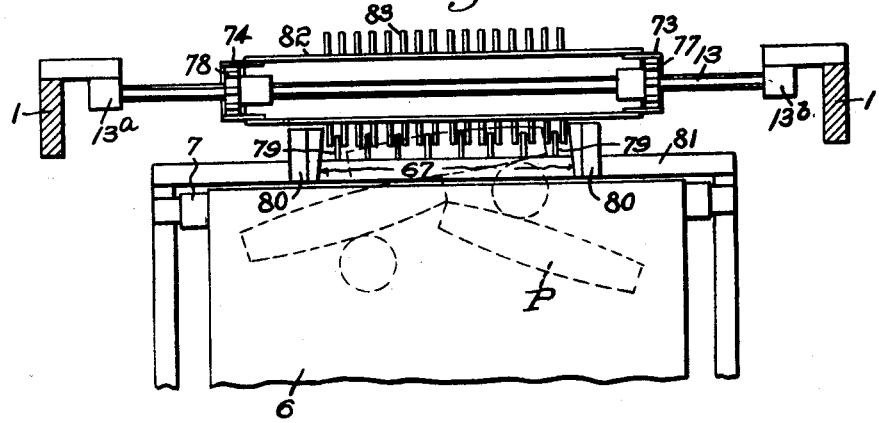
Inventor:
John F. Murphy
Attys

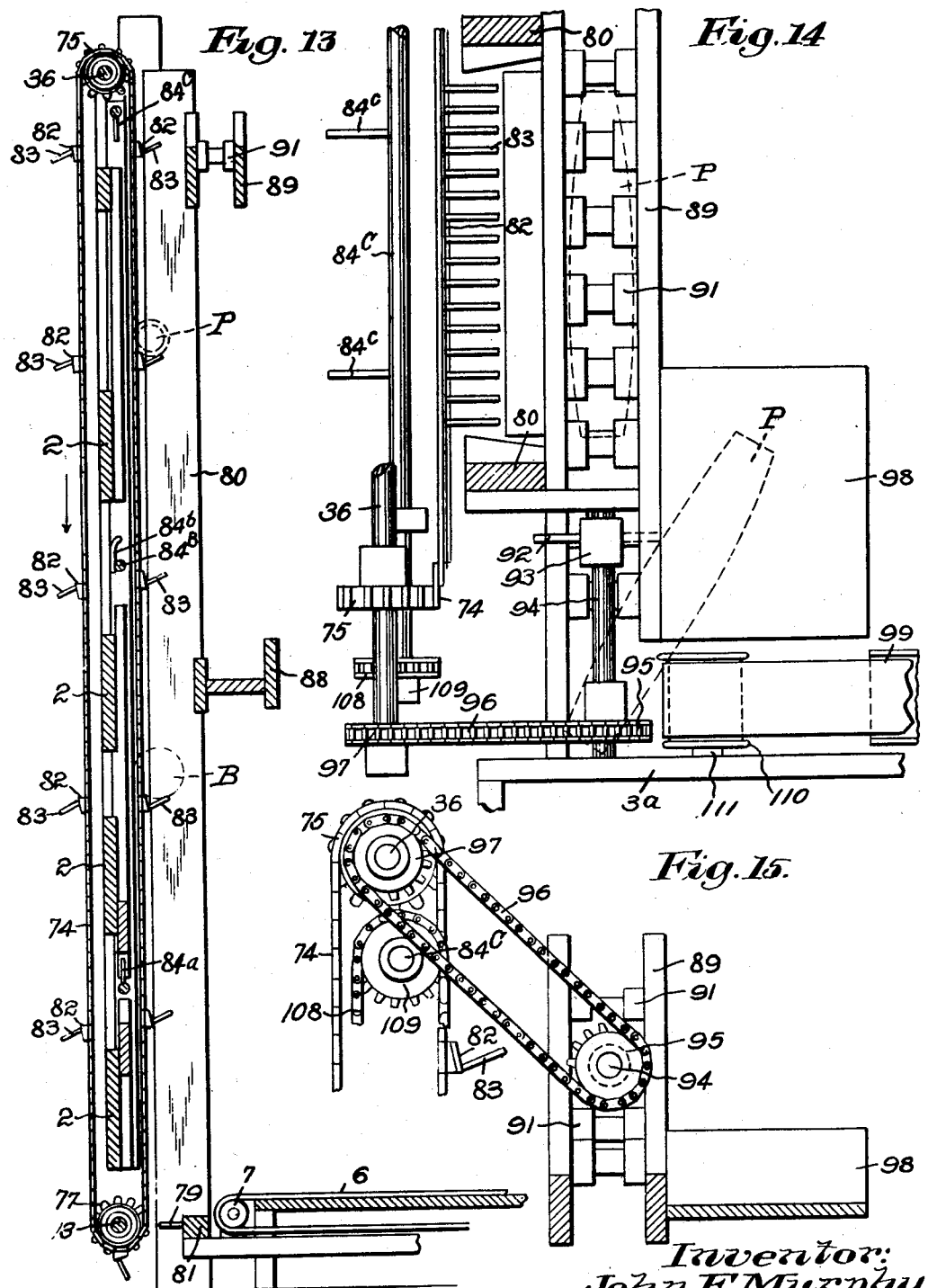

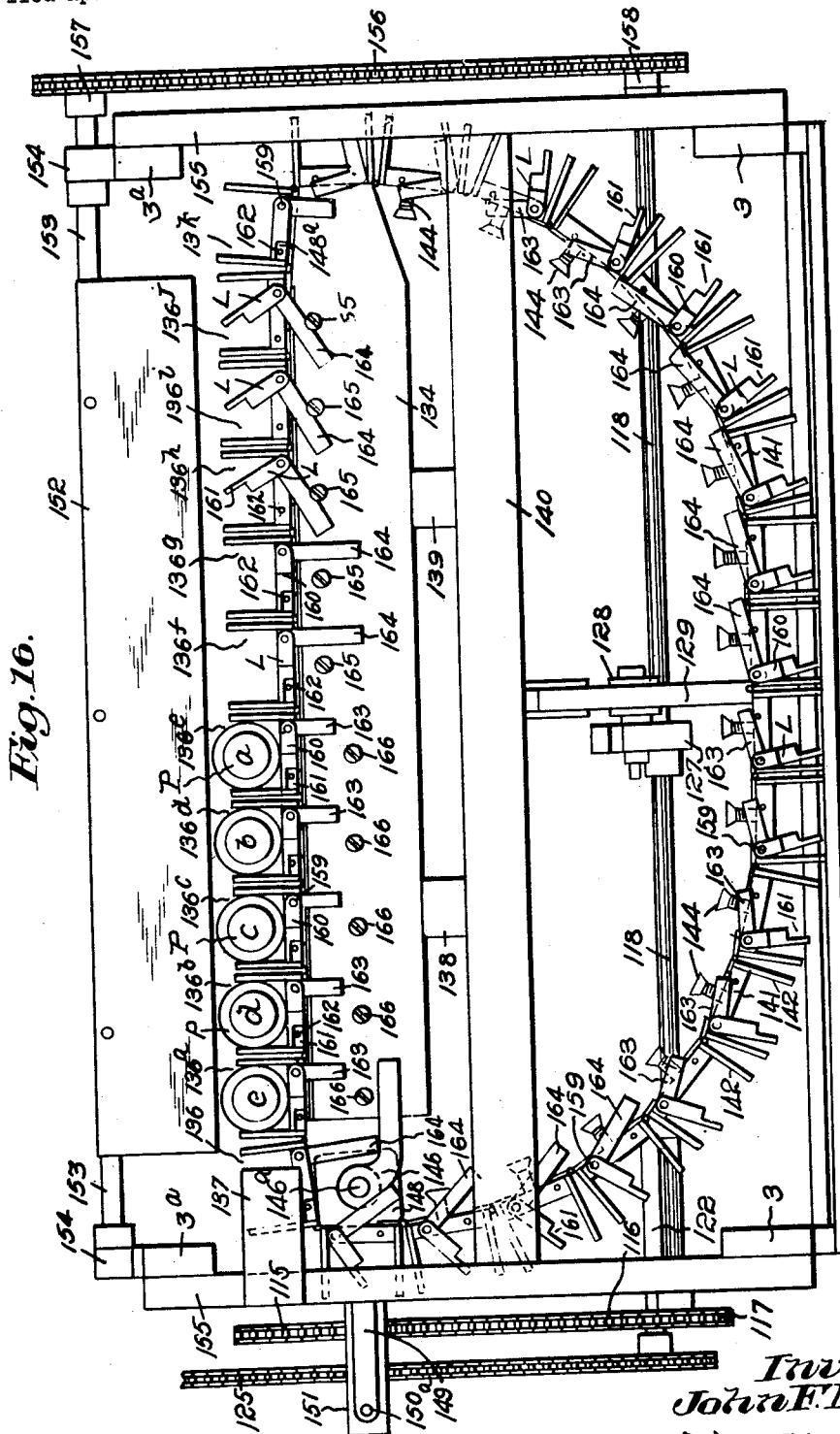

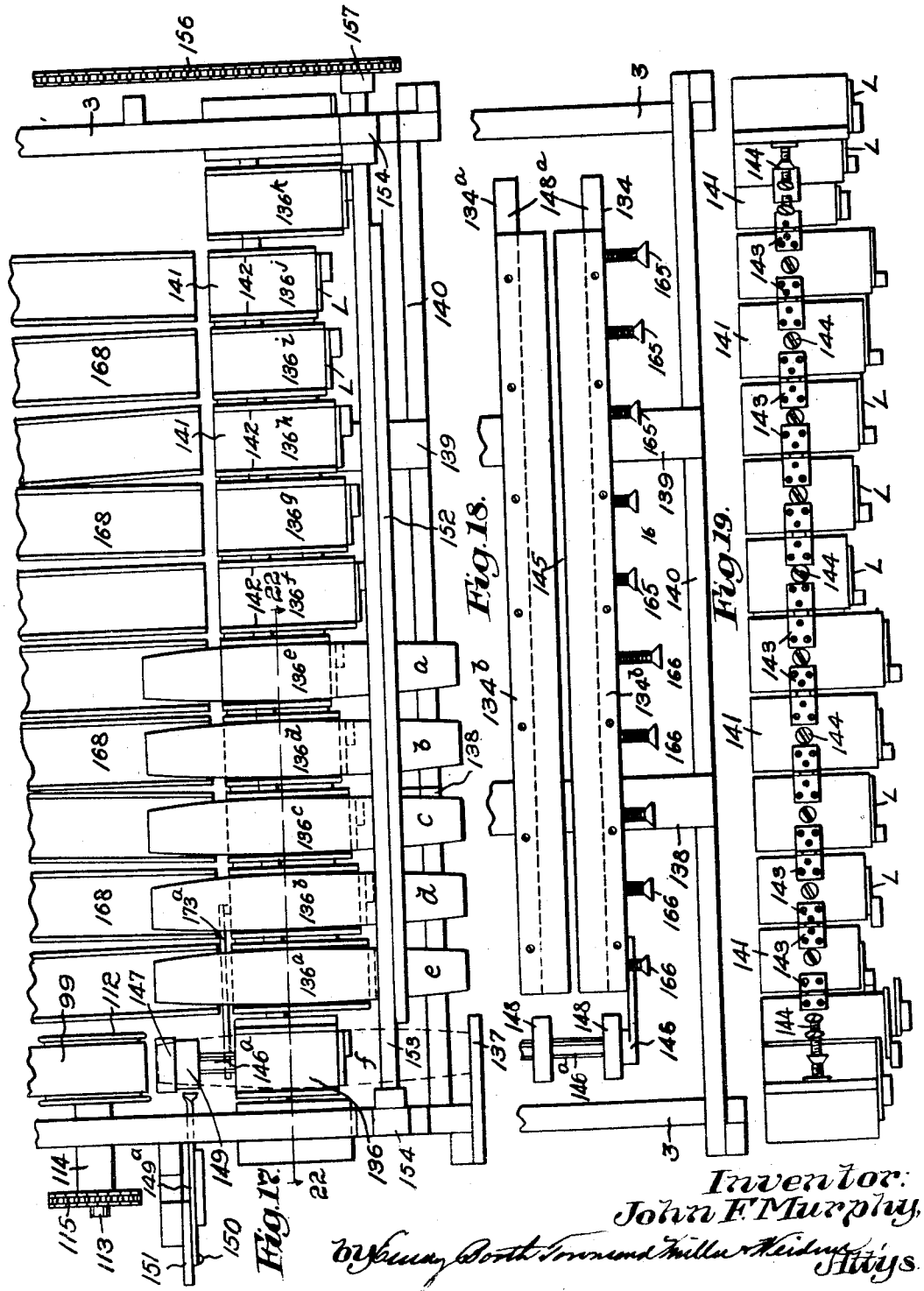

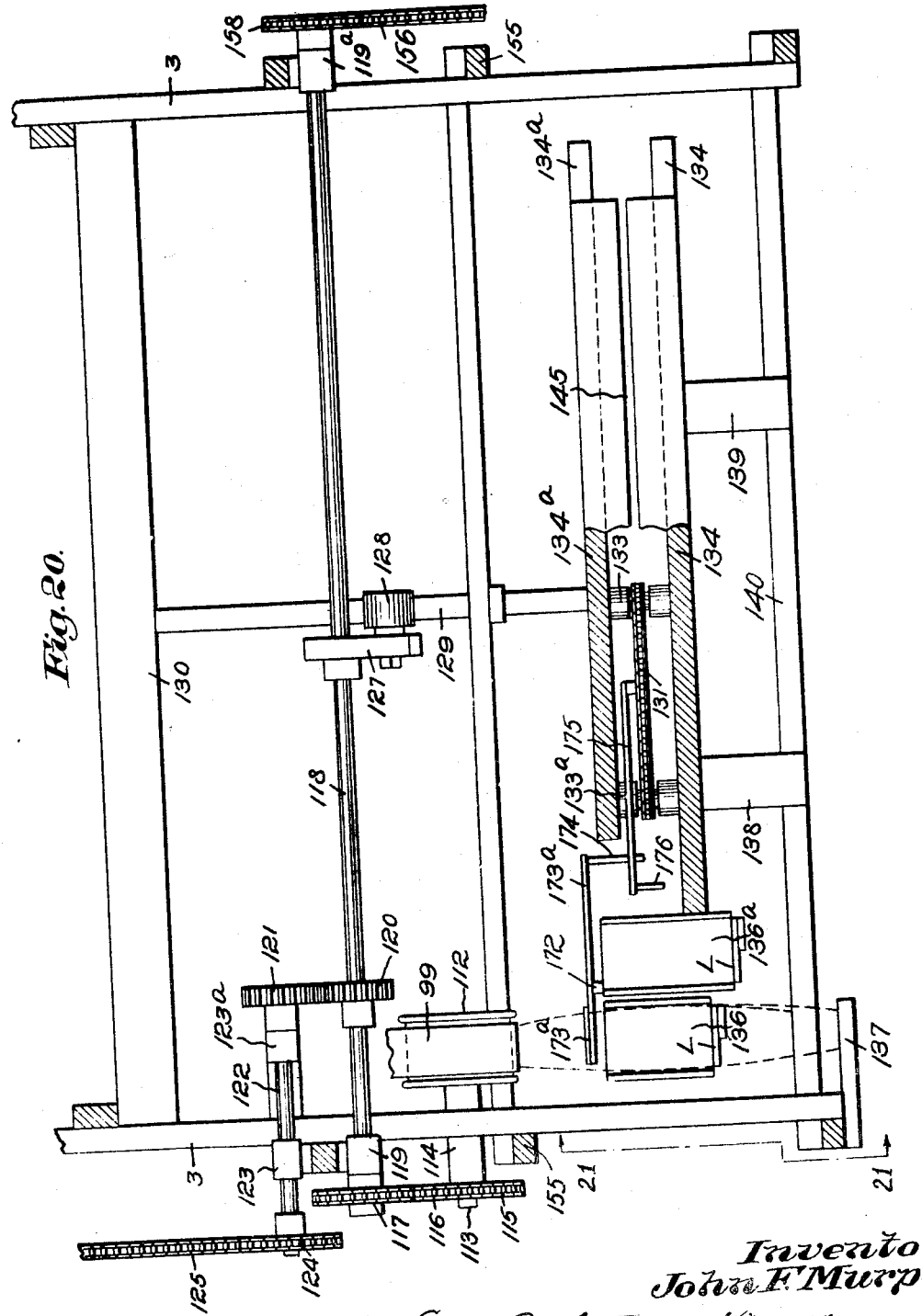

Sept. 28, 1948. J. F. MURPHY 2,450,249
AUTOMATIC PIN SETTING MACHINE
Filed April 13, 1943 21 Sheets-Sheet 13
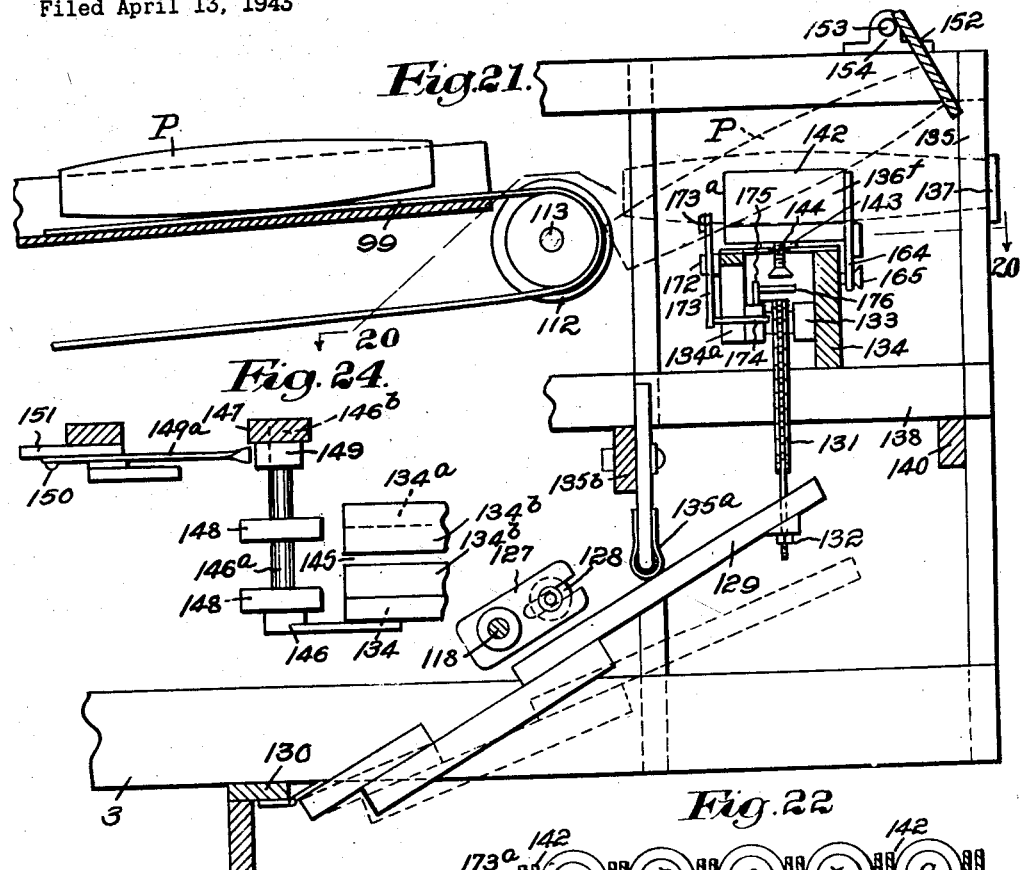
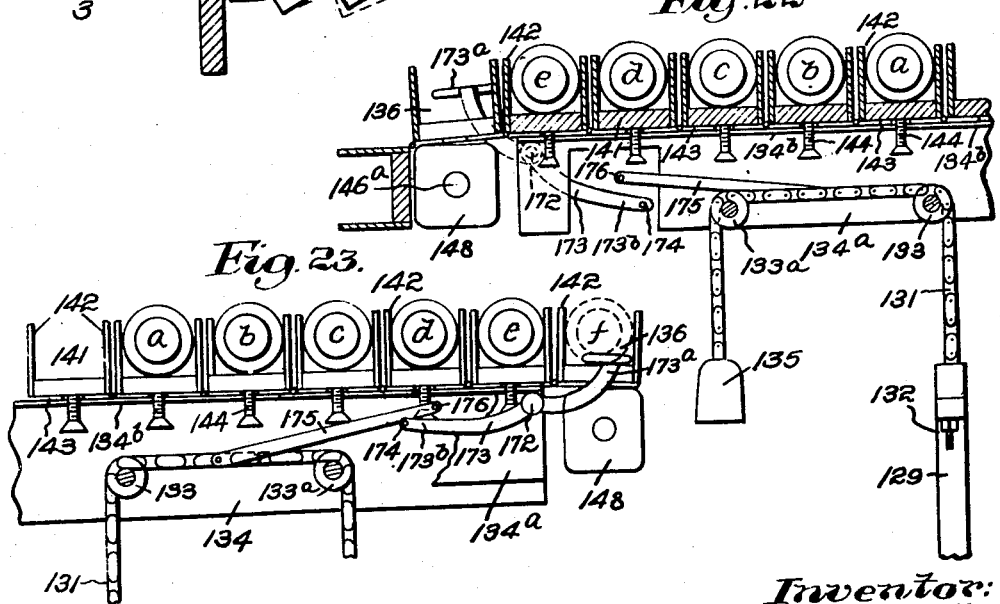
Inventor:
John F. Murphy
Attys.

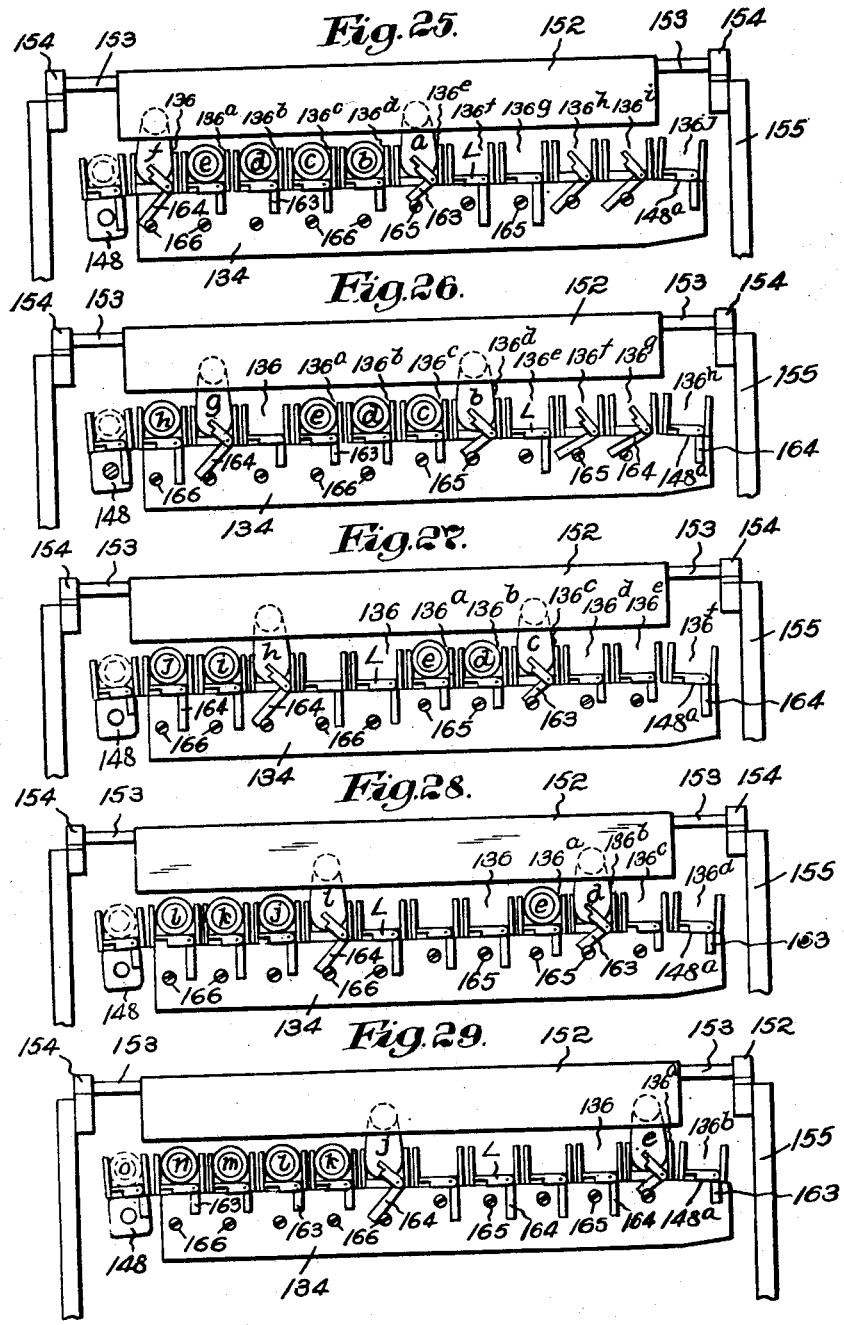

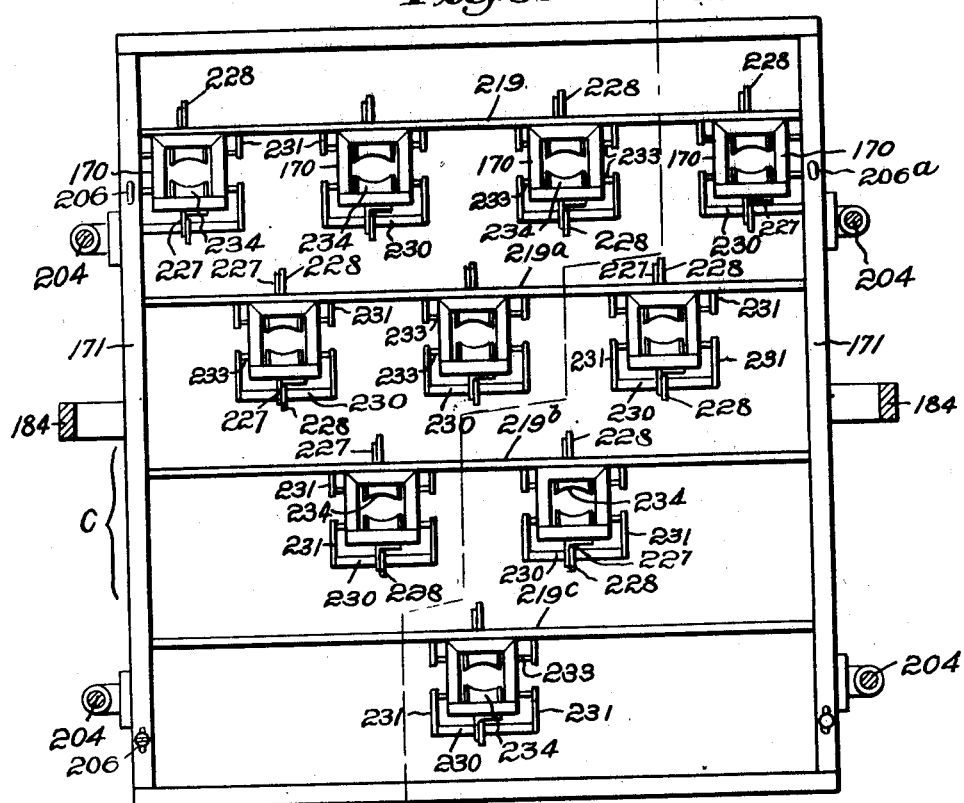
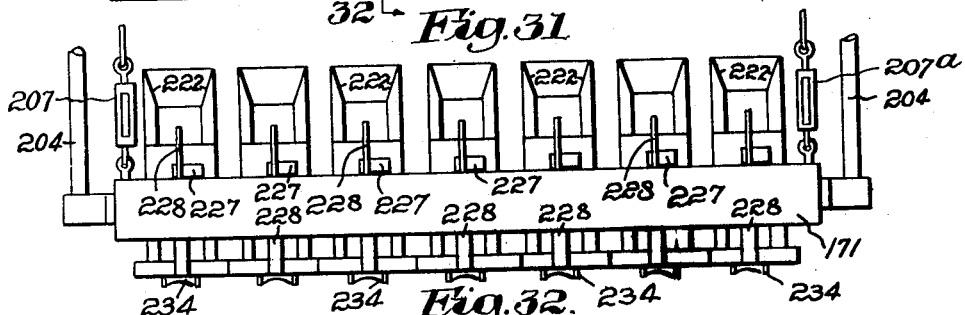
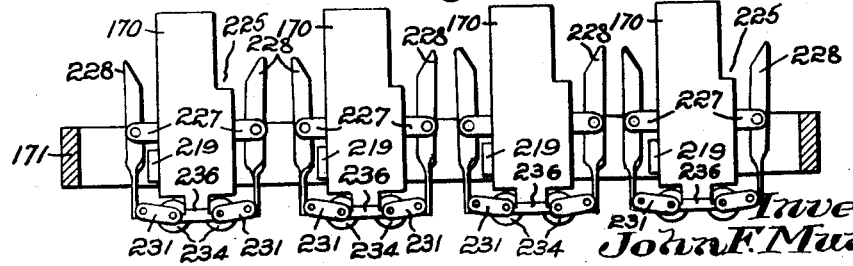

Sept. 28, 1948. J. F. MURPHY 2,450,249
AUTOMATIC PIN SETTING MACHINE
Filed April 13, 1943 21 Sheets-Sheet 16
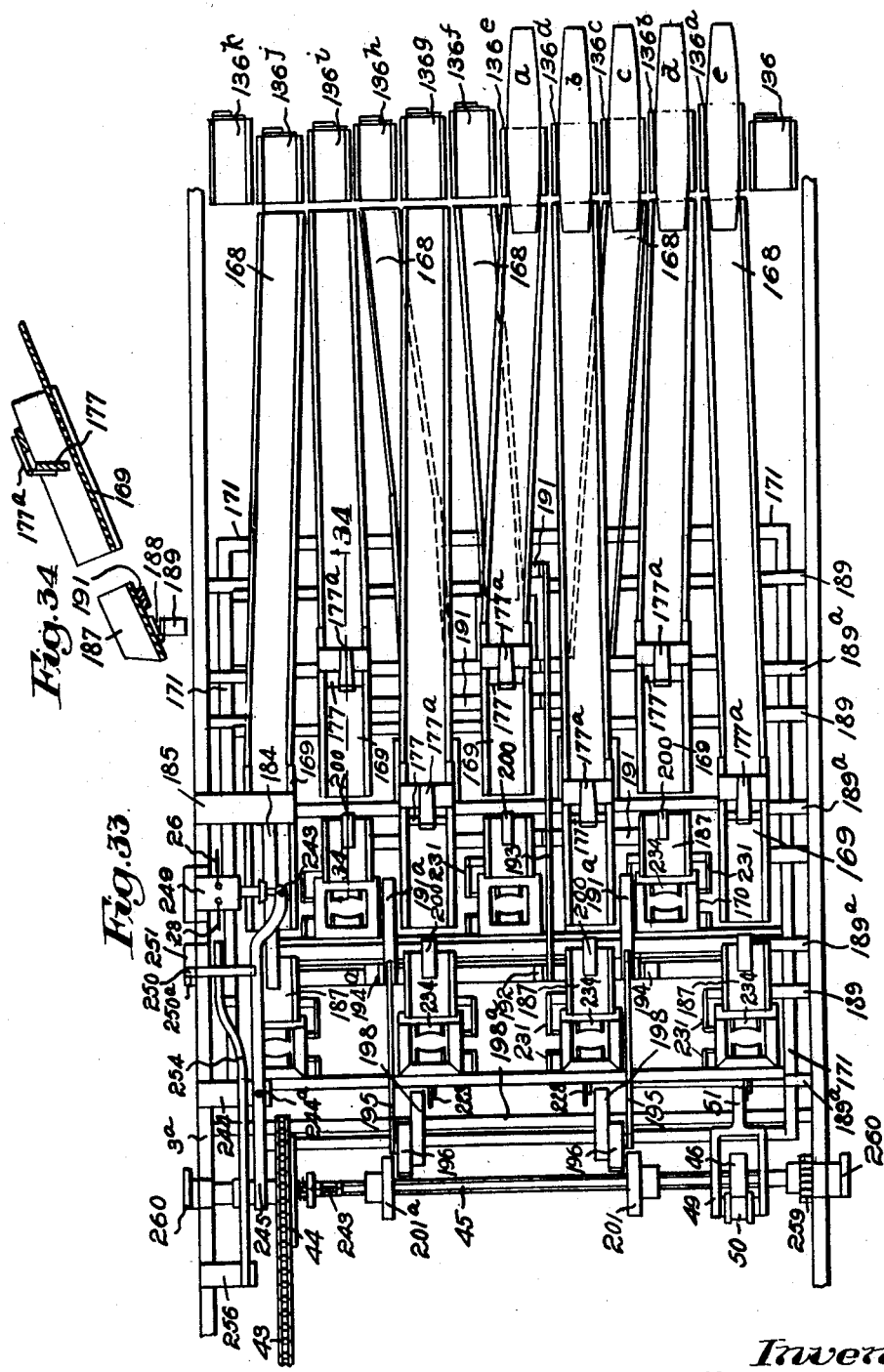
Inventor:
John F. Murphy Sept. 28, 1948. J. F. MURPHY 2,450,249
AUTOMATIC PIN SETTING MACHINE
Filed April 13, 1943 21 Sheets-Sheet 17
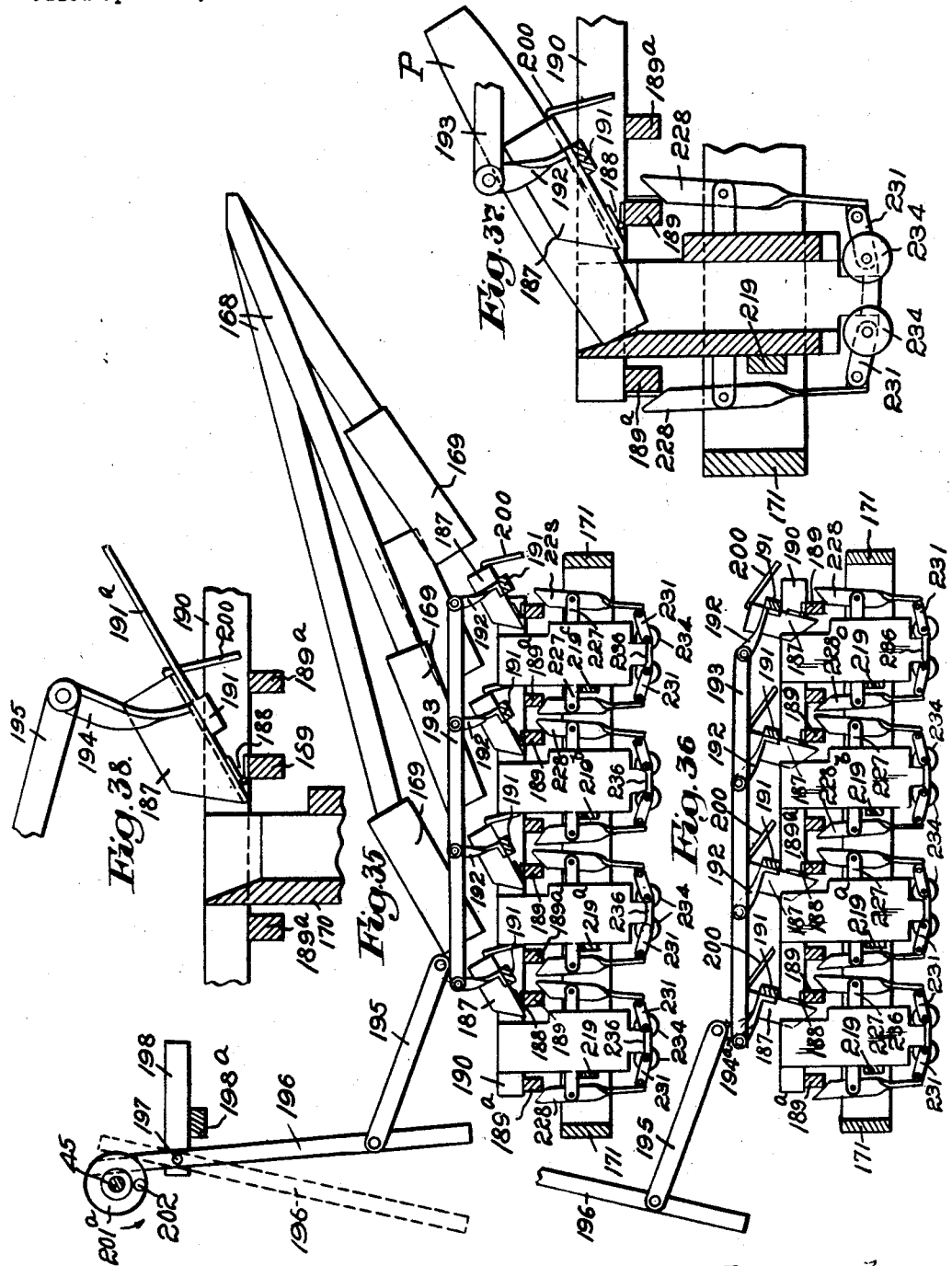
Inventor:
John F. Murphy Sept. 28, 1948. J. F. MURPHY 2,450,249
AUTOMATIC PIN SETTING MACHINE
Filed April 13, 1943 21 Sheets-Sheet 18
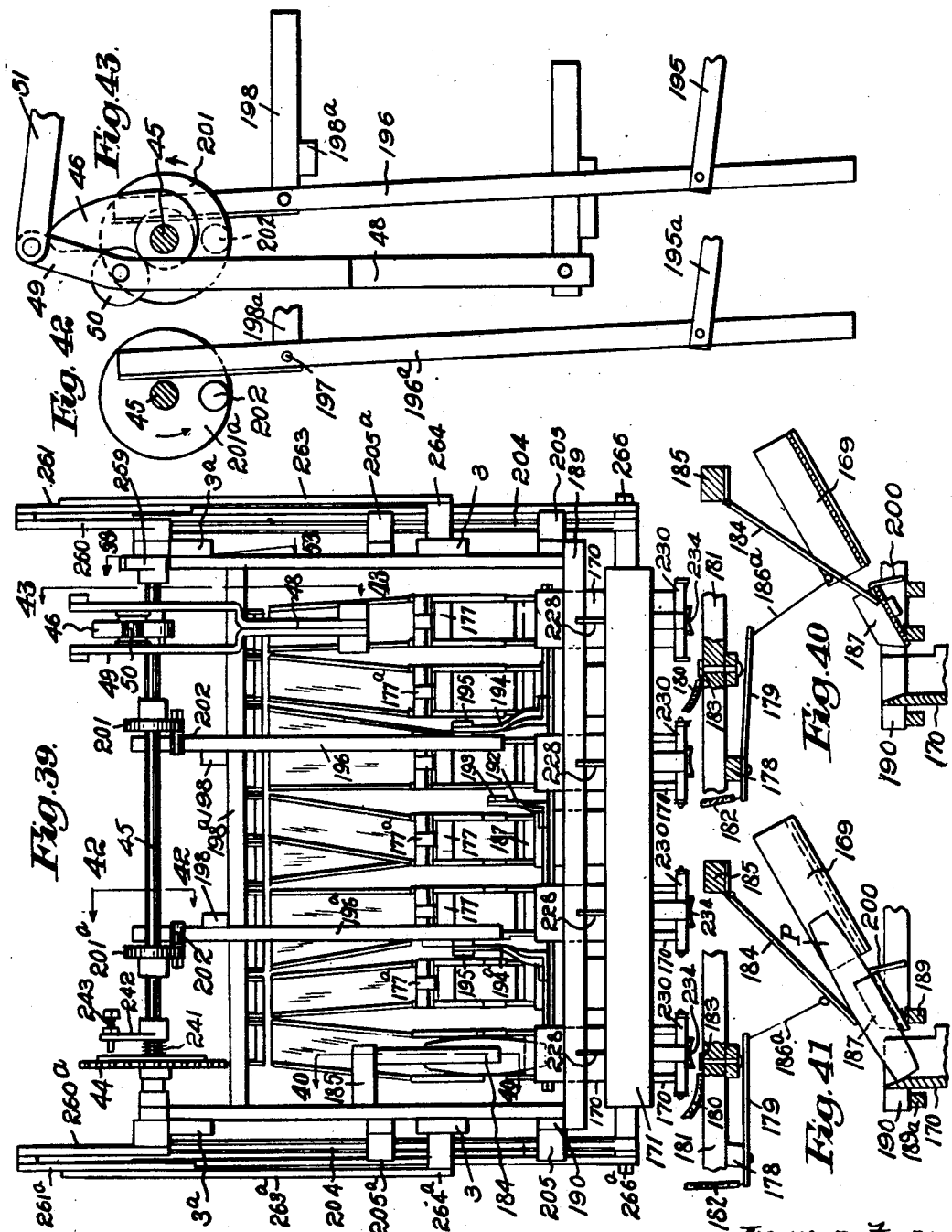

Sept. 28, 1948.     J. F. MURPHY     2,450,249
AUTOMATIC PIN SETTING MACHINE
Filed April 13, 1943     21 Sheets-Sheet 19
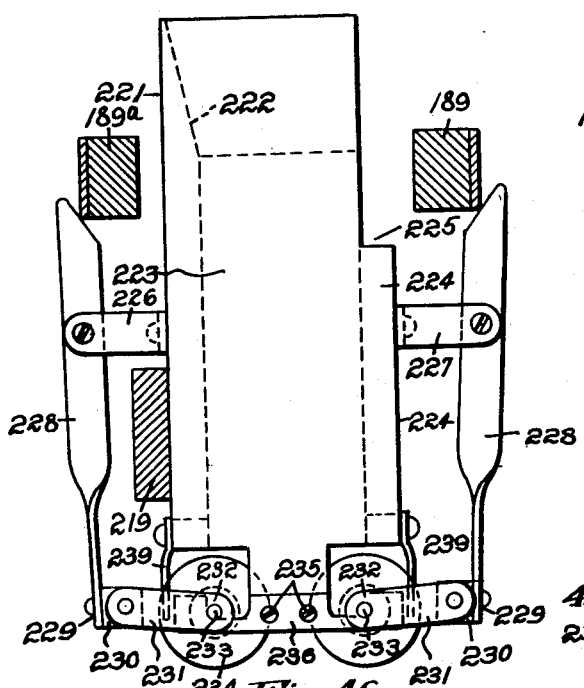
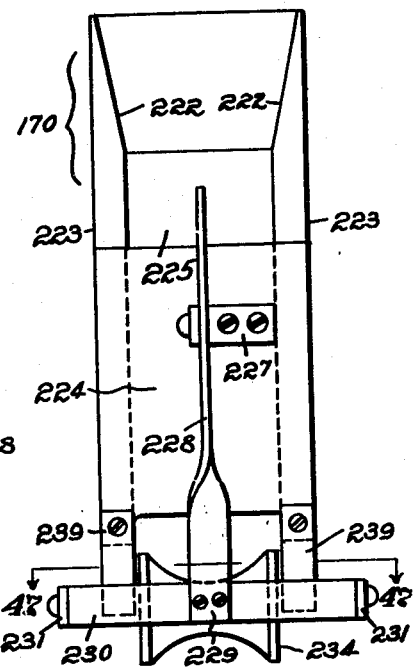
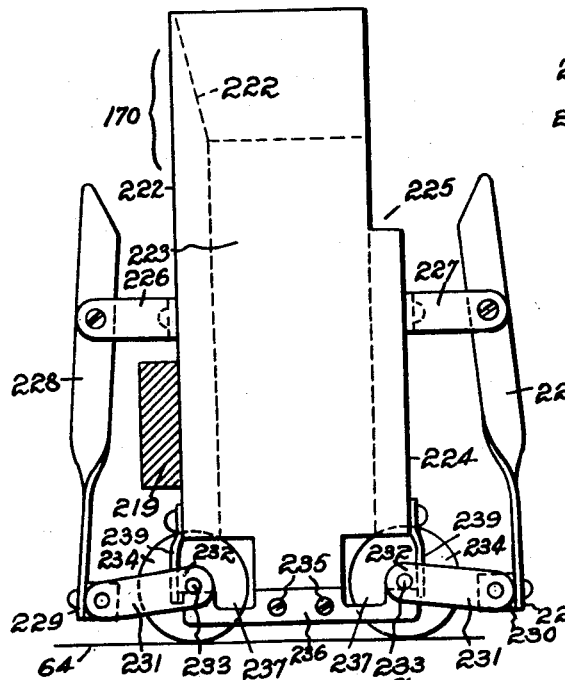
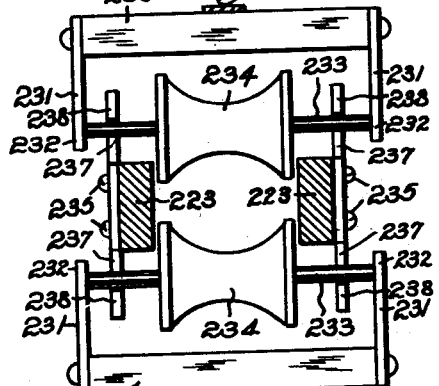
Inventor:
John F. Murphy.

Sept. 28, 1948.  J. F. MURPHY  2,450,249
AUTOMATIC PIN SETTING MACHINE
Filed April 13, 1943  21 Sheets-Sheet 20
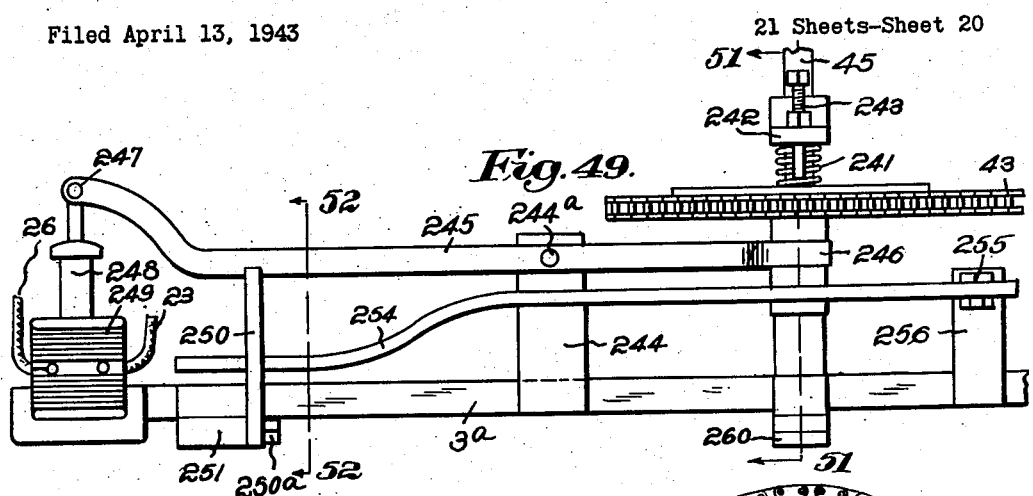
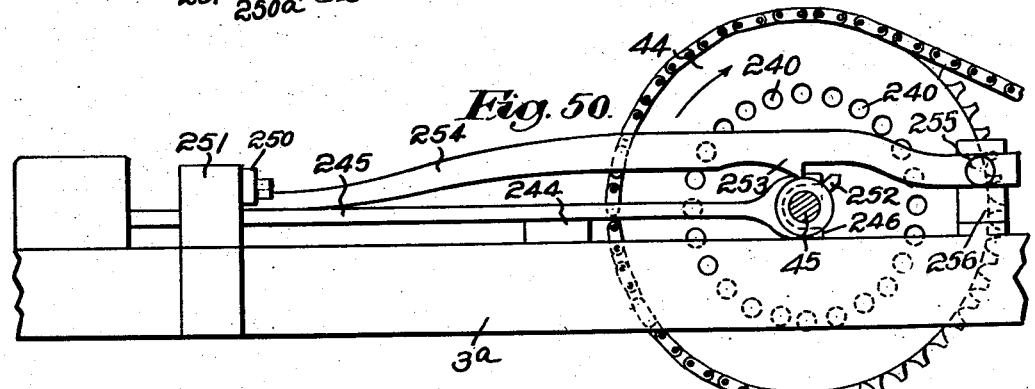
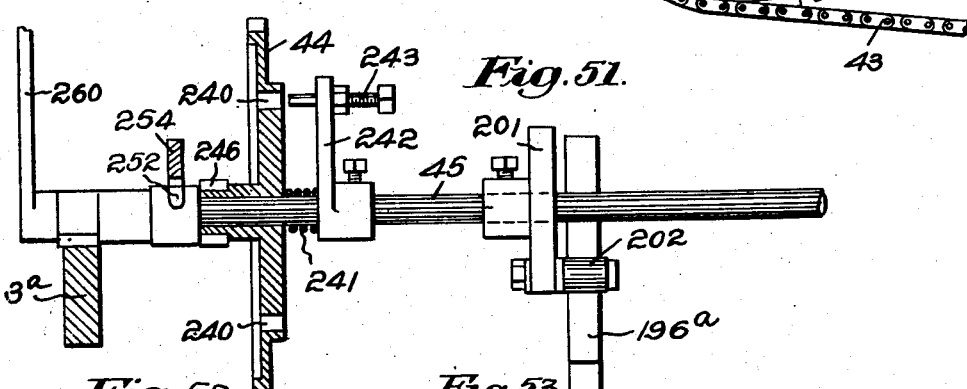
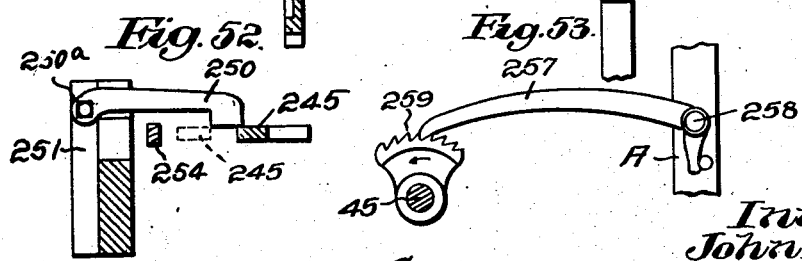
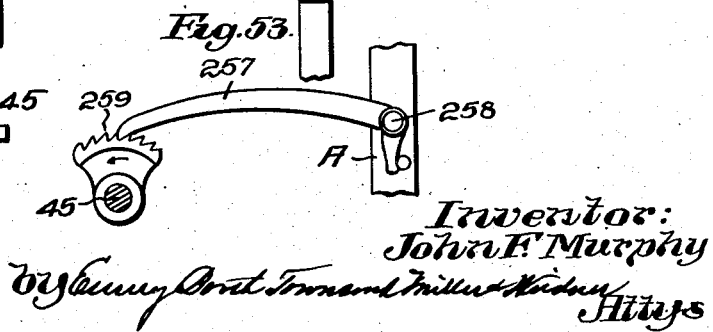
Inventor:
John F. Murphy

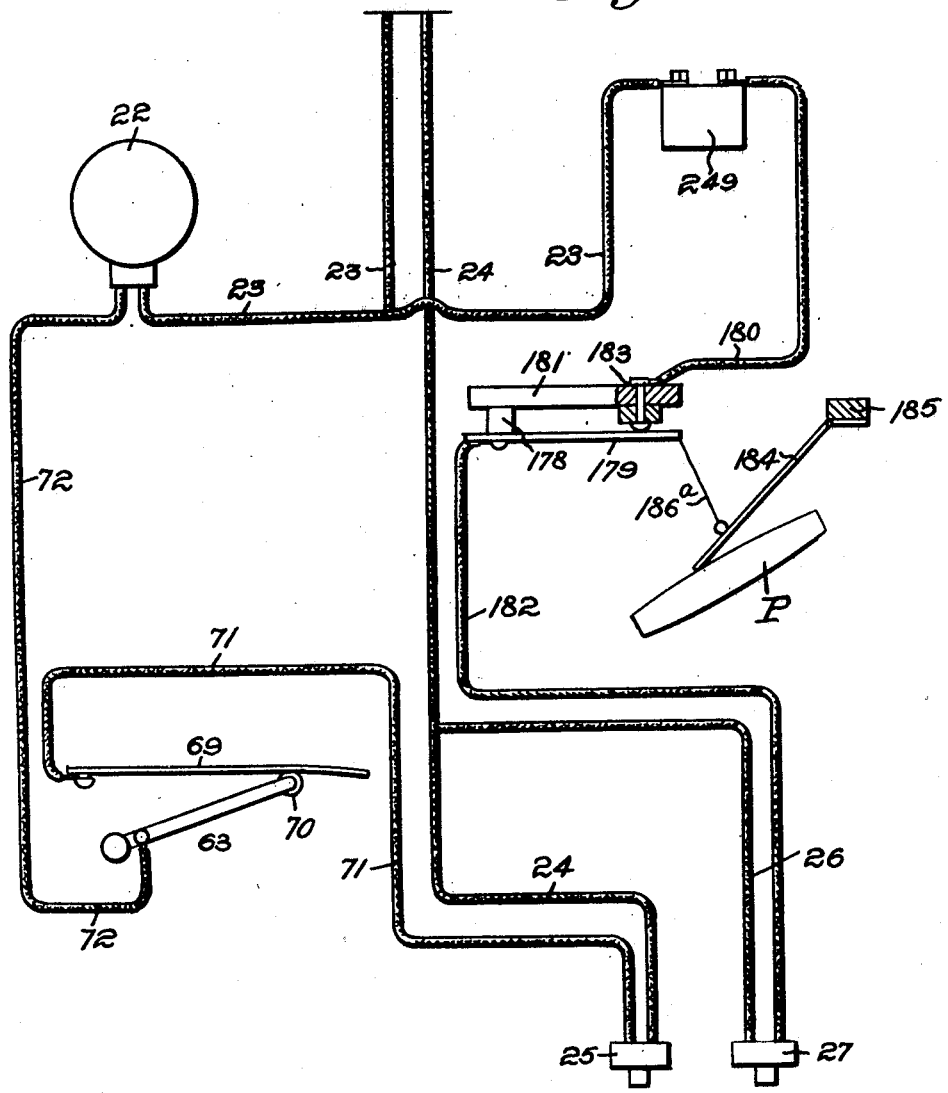

Patented Sept. 28, 1948

2,450,249

UNITED STATES PATENT OFFICE 2,450,249

AUTOMATIC PIN SETTING MACHINE

John F. Murphy, Middleboro, Mass., assignor to Murphy Automatic Pinsetter Co., Inc., Cambridge, Mass., a corporation of Massachusetts Application April 13, 1943, Serial No. 482,852

8 Claims. (Cl. 273—43)

This invention has, for its aim, to provide a novel and improved pin setting machine for bowling alleys using candlepins only, that may be entirely controlled by the player at playing position under all ordinary conditions.

In the drawings:

Fig. 1 is a plan of the machine as viewed from above;

Fig. 2, a partial elevation of the left side of the machine, showing the principal elements for operating the pin spotting cage and the sweep;

Fig. 2a, an elevation of additional elements of the sweep operating mechanism;

Fig. 3, an elevation of the right side of part of the housing, showing additional elements of the pin setting cage operating means;

Fig. 4, a plan of the pin and ball sweep end of the alley and the pit, and a partial horizontal cross-section of the lower end of the ball and pin elevator driving means in the same plane as the alley surface, and a plan of the pit and gutter ball and pin conveying belts and tracks;

Fig. 5, a vertical cross-section of the pin and ball sweep on the line 5—5, Fig. 4, viewed from the playing end of the alley, showing the alley gutters, belts, and a portion of the alley pin sweep;

Fig. 6 is a vertical, longitudinal section, on the line 6—6, Fig. 5, of the ball and pin sweep element in the alley, showing, in dotted lines, the sweep in raised or sweep position, one of the sweep raising levers therefor, and the pin and ball conveying belt in the pit;

Fig. 7, a similar vertical section of the pin sweep shown in Fig. 6 but in a different position, such as might result from a misplaced pin, ball or any article that kept the sweep in that position, and also showing additional elements of the pin sweep raising mechanism;

Fig. 8, an end elevation of the machine from the rear;

Fig. 9, a vertical, sectional view from the front, inside of the machine, on the line 9—9, Fig. 1, looking toward the rear thereof;

Fig. 10, a plan and partial cross-section on the line 10—10, Fig. 9, above the ball and pin elevator, showing one of the leading and one of the returning flights and the pin returning chute and belt;

Fig. 11, a cross-section on the line 11—11, Fig. 9, looking down, showing an elevator flight and the ball returning chute;

Fig. 12, a similar view on line 12—12, Fig. 9 of an elevator flight at the pit level, and showing balls and pins in dotted lines in a common arrangement at the entrance to the elevator;

Fig. 13, a vertical section from the left side near the rear end of the machine, on the line 13—13, Fig. 9, and showing an end view of the ball and pin elevator, and a partial end and sectional view of the ball and pin dischargers, the ball and pin return chutes, and a portion of the pin and ball pit and elevator;

Fig. 14, an enlarged, partial cross-sectional view of the ball and pin elevator near the top, and a plan of the pin return chute and pin turning means for directing the pin to its conveyor belt preparatory to loading the pins in the pin assembly boxes;

Fig. 15, an end elevation of part of Fig. 14, from the left-hand side of the machine;

Fig. 16, a view, from the front of the machine, of the pin assembly boxes and the station at which the pins, delivered by the conveyor belt, are individually loaded in the boxes, five boxes shown so loaded herein, preparatory to the pins being shunted into the several pin cage chutes, from which they are later dropped into the pin setting cage;

Fig. 17, a plan of the pin boxes and assembly station shown in Fig. 16, and a partial plan of the pin cage chutes, broken away;

Fig. 18, a plan of the rails on which the pin boxes slide laterally one by one at the pin assembly station, each box with its pin, preparatory to being shunted into the pin cage chutes;

Fig. 19, a view of the bottom of the pin boxes shown in Fig. 17, suspended from the assembly station, looking down;

Fig. 20, a partial plan of the housing frame on a plane, indicated by the line 20—20 of Fig. 21;

Fig. 21, a fragmentary view, part elevation and part section, from the point of view indicated by line 21—21 on Fig. 20;

Fig. 22, a vertical, partial, sectional view from the front, on the line 22—22 of Fig. 17, showing the pin box step by step advancing means at the assembly station, with no pin in the box 136;

Fig. 23, a section on substantially the same line but looking in the reverse direction, and showing the opposite side of the pin box step moving elements, with a pin in the box 136, shown in dotted lines;

Fig. 24, a detail plan of the pin box positioning means as the box arrives at the assembly station, on a plane level with the bottoms of the boxes and the tops of the box rails;

Figs. 25, 26, 27, 28 and 29 show illustratively the step by step advance of the pins and boxes from the positions shown in Figs. 16 and 17, and how the pins are shunted from their boxes into the pin cage chutes, with pins in the first five boxes when the machine is started for play;

Fig. 30, a plan of the pin setting cage;

Fig. 31, a front elevation of the same;

Fig. 32, a section on the line 32—32, Fig. 30, from the left;

Fig. 33, a plan of the pin setting cage, showing the box ends and pin cage chutes;

Fig. 34, a vertical section on the line 34—34, Fig. 33;

Fig. 35, a side elevation of the pin setting cage and pin cage chutes shown in Fig. 33, and the intermediate pin dumper actuating means;

Fig. 36, a similar view showing the pin dumpers in dumping position;

Fig. 37, a vertical, sectional, enlarged view of a pin cage box, with a pin ready to be dumped therein;

Fig. 38, a partial, similar view showing one of the pin dumpers and dumping brackets;

Fig. 39, a rear elevation of the pin setting cage and pin chutes leading thereto;

Fig. 40, a detail, vertical section, on the line 40—40, Fig. 39, through the tenth pin chute at the left of Fig. 39, showing the cage release means inoperable when the tenth chute does not contain a pin;

Fig. 41, a similar view showing the same elements in position to release the cage when all the pins are in the cage;

Figs. 42 and 43 are enlarged detail views of the pin cage and pin and ball sweep lowering cam and bars actuated thereby;

Fig. 44, a side elevation, enlarged, of one of the pin cage boxes and attachments in pin receiving condition;

Fig. 45, a front view of the same;

Fig. 46, a view similar to that of Fig. 44, showing the pin holding rolls in pin spotting position;

Fig. 47 is a section on line 47—47, Fig. 45;

Fig. 48, a view similar to that of Fig. 44, with the roll links removed to show the roll axles in pin releasing position, as in Fig. 44;

Fig. 49 is a plan of the sweep operating and pin cage lowering and raising clutch elements;

Fig. 50 is a side elevation of the same;

Fig. 51 is a vertical section on the line 51—51, Fig. 49, showing the clutch in section and its cooperating locking pin;

Fig. 52 is a section on the line 52—52, Fig. 49;

Fig. 53 is a section on line 53—53, Figs. 1, 39, from the right, showing the pawl which prevents the shaft from rotating backward and raising the cage slightly out of position; and Fig. 54 is a wiring diagram of the electric circuits.

My invention, as illustrated in the drawings, comprises, Figs. 1, 2, 2a, 3, and 8 to 10, a frame "housing" A, substantially rectangular, comprising suitable upright members 1, and cross or lateral cooperating members 2 properly secured thereto by bolts or any suitable means, not shown, and also longitudinal members 3, 3a, some of which are shown, the machine being designed to stand at and extend over the pit end of the usual bowling alley sufficiently far to position the ball and pin gathering means or sweep at the end thereof, the alley proper, as usually constructed, being shortened by the length of the sweep element of the machine.

The embodiment of the machine shown is designed for use with candlepins and therefore embodies no means for handling dead-wood left on the alley floor between successive balls constituting a box. The machine shown is operated by electricity, but another form of power obviously may be used, if desired, by simply modifying the operating connections between the machine and power plant and without modifying other and novel features of the invention.

The use of available machines of this type, with pin setting and pin and ball returning mechanisms and horizontally movable and also downwardly and laterally curving pin sweeping means, as well as other elements, has not been altogether satisfactory and successful, and I have provided herein a much more effective and satisfactory machine, including novel pin and ball elevating and returning means, pin setting means, and pin and ball sweeping means, as well as other elements and improvements, as parts of my invention.

The main functions of the machine are naturally divided into two; first, the clearing or sweeping of the alley of pins and balls after a player has thrown the prescribed number of balls, or where the pins and balls have been previously left in confusion, the returning of the balls to playing position, and the returning of pins to their pin cage boxes preparatory to resetting them; and, second, the resetting or spotting of the pins on the alley for the player.

*The pin and ball sweep and their return to their normal positions*

Therefore, assuming that the object is to perform the first function, and the alley being equipped, Figs. 4, 5, with the usual gutters, 4, 4a, and belts 5, 5a, with pin driving spurs 5b, therein, and Fig 6, the pin belt 6 actuated by a roll 7 and suitable mechanism, to be described later, and inclined pit walls 8, Fig. 4, to direct the pins and balls automatically to the pit, the means for carrying out the first function of the machine will be described.

The roll 7, Figs. 4, 6, carrying the belt 6, is driven by a chain 11 on the sprocket 12, Fig. 8, on the shaft 13 which is mounted in bearings 13a, 13b, Fig. 9, at the machine base and driven in turn by chain 74 and sprocket 76 on the main shaft 36, Fig. 9, at the top of the machine which is operated by a sprocket 35, chain 34, and sprocket 33 on shaft 32 driven by a pulley 31, and belt 30 thereon, and on pulley 29 on motor shaft 28 of motor 22, on the left side of the machine, Fig. 9. The belt 6 connects roll 7 and roll 14 (Fig. 4) the latter located near the end of sweep 64, hereinafter to be described, and the shaft of the former is driven by chain 11 from sprocket 12 on shaft 13. The shaft 15 of roll 14 carries a sprocket 16 and chain 17 that drive the gutter belt shaft 18 through sprocket 19, and which shaft carries gutter belts 5, 5a. From any suitable point over the belt 6, Fig. 6, may hang the usual buffer 21 for the balls and pins to protect, among other elements, the ball and pin elevator.

*The pin and ball sweep mechanism*

At any convenient point on the frame A, or elsewhere, Figs. 2, 9, herein on the left side as seen by the player, an electric motor 22 of suitable power, in the usual case three-quarters of one horsepower, is mounted and suitably connected with a source of power by a circuit comprising wires 23, 72, broken away in Fig. 9, controlled by a switch 25, Fig. 54, located preferably near the playing position, and controlling the usual functions of the machine except the functions of the pin sweep and the pin cage. A second circuit 26, Fig. 54, includes a special control switch 27 for operating the pin setting cage and the pin and ball sweep, referred to hereinafter, and may be mounted upon any convenient support, preferably near the player.

The motor shaft 28, Figs. 2, 9, drives the main shaft 36 through the pulley 29, belt 30, pulley 31, shaft 32, sprocket 33, chain 34, and sprocket 35, as stated. On the shaft 36, Figs. 2, 8, 9, is a sprocket 38 which carries a chain 39 running also over a sprocket 40 lower down, and on a shaft 41 within the frame, Fig. 2a. On the shaft 41, Figs. 2a, 8, 9, is also a small sprocket 42 over which travels a chain 43 which, Fig. 2a, drives the larger sprocket 44 on the clutch shaft 45, near the top of the housing, on which shaft is a cam 46 rotating from right to left, Figs. 2a, 39, 43. The functions of this clutch shaft and cam in connection with other elements to be described later are to lower and raise the pin and ball sweep and the pin setting cage, and the latter for convenience will be referred to in detail later.

On the longitudinal frame beam 47 within the housing, Figs. 2a, 39, 43, is pivotally mounted an arm 48, its upper end forked at 49, which arm carries, rotatably thereon, and opposite the cam 46 on shaft 45 and to cooperate therewith and the elements just recited, a roll 50 against which the cam 46 rotates. The fork 49 of arm 48 is connected to a rod 51 which, Fig. 2, in turn, is connected to an arm 52 on shaft 53 which arm carries an arm 54 to which is connected, Figs. 2, 7, a rod 55 carrying at its lower end a chain 56 running over a sprocket 57 on the longitudinal sweep support 58, and which chain 56 actuates an arm 59 fast on a shaft 60 carried in bearings 61, 61a, Fig. 5, on a lateral sweep support beam 62, which shaft 60 extends across the sweep supports 58 and carries, Figs. 5, 7, arms 63, 63a fast at their inner ends to the shaft 60, the latter elements being beneath the pin sweep section 64 of the alley which is hinged, Fig. 7, at 65 to the lateral sweep support beam 66.

By the action of the cam 46 against the roll 50, described, Figs. 2a, 43, and the consequent movement of the forked arm 48 and of the link or rod 51 to the left and the movement of arms 52, 54 on shaft 53 and the movement of rod 55 and chain 56, my novel pin forward sweep is swung upward on its hinges 65, dotted lines, Fig. 6, and any balls and pins remaining thereon are caused to roll toward the pit 9 and elevator passage 67, Figs. 4, 6, or to fall on the pin belt 6 and the gutter belts 5, 5a which convey them to the pin elevator passage 67, Figs. 4, 12, between the pit walls 68, 68a leading to the ball and pin elevator, to be described, with the help of the belt spurs 5b.

On the under side of the pin sweep member 64, Figs. 5, 6, 7, are secured two longitudinal metallic bars 69, 69a near the opposite side edges of the member. Under normal conditions, Figs. 5, 6, both bars 69, 69a rest upon rolls 70, 70 on the ends of the sweep raising arms 63, 63a which, as stated, are secured to the shaft 60 supported in bearings 61, 61a on the cross beam 62. From one end of one bar 69 runs an electric circuit line 71 to and as a part of the sweep operating control circuit, 71, 24 and switch 25, Fig. 54, and from one arm 63 a similar line 72 runs to the motor 22, connected by wire 23 to the source of power, previously described, see wiring diagram, Fig. 54, thus completing the electric circuit through one arm 63 and one bar 69 when the switch 25 is closed, and in connection with elements already described effecting the action of the pin sweep member.

But if, when the sweep 64 is operated as above described, a pin P should be left lying in the alley, for instance as shown in dotted lines, as rarely happens, Fig. 7, with the result that, when the sweep is raised, the pin rolls beneath the sweep, and when the sweep is lowered the bar 69 over the arm 63 fails to come to rest upon its roll 70 on arm 63, then the connection to the motor circuit line 23 and through the lines 71, 72, Fig. 54, is broken and the sweep, when lowered, will rest on the pin, dotted lines, Fig. 7, and the sweep cannot be lowered further, nor the machine and the circuit made operative until the pin has been removed and control of the sweep and machine restored through the circuit 71, 72.

*Pin and ball elevator means*

On the rear end of the housing, Figs. 8, 9, is a novel pin and ball conveyor or elevator B comprising chains 73, 74 running vertically and over sprockets 75, 76 on the main shaft 36 at the top of the machine and similar sprockets 77, 78 on the bottom shaft 13, and the chains are provided with elevating flights 82, to be described.

At the pit floor level entrance 67, Fig. 12, to the ball and pin elevator path, between two uprights 80, are laterally extended pins 79 on a bar 81, which pins extend a short distance into the elevator path to prevent a pin or ball from dropping from the floor into the opening and beneath the floor.

The elevator flights, Figs. 8, 9, as many as are necessary, comprise herein eleven rods 82 with pins 83 extended laterally therefrom, see also Figs. 10, 11, 12, 13, which flights travel downwardly on the outside of the rear end of the machine and upwardly on the inside thereof, Fig. 13, with the pins 83, or other elements, extended laterally into the upward path of the elevator between the uprights 80, Figs. 8, 9.

The balls and pins, Fig. 12, are carried automatically on the pin belt 6 and gutter belts 5, 5a in the pit into the path of the flights which pick them up at the elevator entrance 67 and carry them up to the proper discharge points, where each is discharged by a suitable discharge element which contacts it at the proper point and time.

Cooperating with the flights 82, Figs. 8, 9, are three ball and pin dischargers comprising, respectively, shafts 84A, 84B, 84C with pin and ball discharging elements, pins 84a, a wing 84b, and long pins 84c, respectively, thereon mounted in bearings 85 on the uprights 86 and rotated by sprocket 101 on shaft 13, chain 100 running over said sprocket and sprocket 102 on shaft 84A, a sprocket 103 on the opposite end of shaft 84A, chain 105 on said sprocket and also on sprocket 106 on the shaft 84B, and chain 108 on sprocket 107 on said shaft, said chain running over a sprocket 109 on the shaft 84C.

The rods 82 of the flights, Fig. 12, are not long enough between the uprights 80 in the pit to permit both a pin and a ball to become positioned in a straight line on the same flight, but if, perchance, a pin should become partly positioned on top of a ball in any position, the discharger pins 84a on the lower discharge shaft 84A would knock the pin off without disturbing the ball because the discharger cuts the path of the flight sufficiently in advance of the arrival of the flight to contact a pin resting on a ball on the flight and too early to contact the ball itself, and furthermore, Fig. 8, a baffle board 85a with slots 86a is provided just above the lower end of the elevator path through which the lower discharger pins 84a pass but the board will not permit a ball or pin to fall backwardly from the pins 83 on either rod 82.

The middle ball discharger 84B has a wing 84b wide enough to remove a ball, but not a pin, because it is of less diameter, from the flight 82 at approximately the level of the ball return chute 88, Fig. 9, leading to the usual return track, not shown, to playing position.

These dischargers rotate twice on their axes between the passing of one flight 82 and the arrival of the next flight, and are timed in their action to discharge a ball or pin as intended from a flight as it arrives opposite to the proper discharger and substantially opposite, for instance, the ball chute 88 or pin chute 89.

The upper discharger 84C has pins 84c long enough to always reach and discharge a pin from the flight 82 just above the level of the pin chute 89, Fig. 9, whence, Figs. 10, 14, the pin P slides lengthwise downwardly through the chute 89 on rolls 91. The arm 92 in the hub 93 on shaft 94 rotates with the shaft 94 above the end of the chute 89, Fig. 14, and the shaft has a sprocket 95 driven by a chain 96 on a sprocket 97 on the main shaft 36 on the frame A, Figs. 10, 14, and by said arm 92 the pin is turned sufficiently to slide sidewise, dotted lines, Fig. 14, onto the slanting shelf 98 and then to the belt 99, and thence is carried lengthwise forwardly to the pin boxes at the pin assembly station, to be described.

*Pin box loading means*

The pin carrying belt 99, Fig. 14, runs over a pulley 110 on a shaft 111 inside of and near the rear of the housing, and, Figs. 14, 17, 20, 21, is driven by a pulley 112 on a shaft 113 in bearings 114 on the left side of the frame, and on shaft 113 also is a sprocket 115 carrying the chain 116 running on a sprocket 117 lower down on the frame and on shaft 118 in bearings 119, 119a also on the opposite side of the frame, Figs. 16, 20, 24, and by which shaft 113 is driven.

On shaft 118, Fig. 20, is a gear 120 which is driven by a gear 121 on a short shaft 122 in bearings 123, 123a on the frame. On the shaft 122, in turn, is a sprocket 124 which is driven by a chain 125 and sprocket 126 on shaft 36, Figs. 8, 9, at the top of the housing. By gears 120, Fig. 20, and 121 the drive for shaft 118 and belt pulley 112 is thus reversed from the direction of drive at the rear of the machine.

On this shaft 118, Fig. 20, is an arm 127 with a roll 128 thereon which, Fig. 20, overlies an inclined arm 129 hinged at its lower end, Fig. 21, to the cross bar 130 of the housing frame bar 3, and thus each rotation of the arm 127 and roll 128 depresses the arm 129 and draws downwardly a chain 131, Figs. 21, 22, 23, to which arm 129 it is secured at 132, the chain, Figs. 20, 23, running over rolls 133, 133a between beams 134, 134a, and on the end of the chain is a weight 135 which assists in returning the arm 129 to normal position, and which elements cooperate in effecting the proper travel of the pin boxes and pins, as will be described presently. When the arm 129, Fig. 21, is raised, a buffer 135a on the frame bar 135b eases the impact of the bar 129 against it on its up swing.

*Pin box loading and unloading means*

The bowling pin leaves the forward end of belt 99, Figs. 20, 22, and slides into a novel pin box 136 and is stopped, if necessary, Fig. 20, by a barrier 137 on the housing frame, and the box is simultaneously also aligned horizontally with herein, eleven other similar laterally traveling boxes 136a, 136b, 136c, 136d, 136e, 136f, 136g, 136h, 136i, 136j, 136k, Figs. 16, 17, which are part of a chain of boxes and are arranged in a row side by side, Figs. 16, 17, 19, and are part of an assembly station for pins, on beams 134, 134a of the frame, Fig. 18. Fastened to the top of the beams, Fig. 18, are metal rails 134b, the beams being supported in turn on two larger beams 139, 139 resting on the beam 140 of the frame A near the front of the machine.

The novel pin boxes, Figs. 16, 22, 23, each have a bottom 141 and sides 142. The number of boxes in the chain may be any desired number within certain limits, herein it is thirty, which I have found the most satisfactory, ample to care for the number of pins in the equipment, permitting ten pins to be set up on the sweep, ten in the cage, and five in the boxes at the assembly station, Figs. 16, 17, at one time. The boxes are pivotally connected in a row, forming a traveling chain, Fig. 16, as by hinges 143 on the box bottoms, Fig. 19, and, Fig. 16, from each box bottom extends downwardly a box advancing element, as a screw 144, thus adjustable thereon, and which screw travels longitudinally in the slot 145, Fig. 18, between the metal rails 134b on which the boxes are caused to slide from left to right by a step by step motion to be described.

Only ten of the boxes act as chute loading boxes at one time, and they are each opposite and lead to a pin cage chute while on the rails 134b and are positioned in a row on the rails, while the balance, except box 136, which number is applied to the box which happens to receive the pins from the belt and temporarily rests upon discs 148, Fig. 18, on shaft 148a, and box 136k, to be described, and which rests upon the inclined ends of beams 134, 134a temporarily, at the opposite ends respectively of the row, Fig. 16, are suspended by their hinges from the other boxes in a semi-circle below. These numbers recited indicate always the boxes which at any given time occupy the positions shown in Figs. 16, 17, and so numbered.

At the left end of beams 134, 134a, Figs. 16, 17, 22, 24, is a bearing 146 mounted on one of the beams and receiving one end of the shaft 146a, the opposite end of which shaft is seated in a bearing 146b, Fig. 24, on the upright frame member 147, and said shaft carries near its outer end and just below the top of beam 134, two rectangular discs 148, as described, one edge of each of which engages the flat bottom of each box 136 as it arrives at the discs, Fig. 22, while the box 136k at the opposite end of the row, Fig. 16, rests on an incline 148a on the top of members 134, 134a, above described. In Fig. 24, the shaft 146a is shown as having thereon a square nut 149 and is prevented from turning backward under the weight of the empty depending boxes 136 by a weighted pawl 149a pivoted at 150 on arm 151 on one of the uprights of the frame A and which pawl would contact the nut and prevent the backward rotation.

Above the boxes, Figs. 2, 16, 17, 21, is pivotally mounted a pin shunting and chute loading element, in the form herein of a board 152, upon a shaft 153 rotatably mounted at its ends in bearings 154 on the two members 3a at the top of upright posts 155 in the frame, and which shaft 153 is driven by a chain 156 on a sprocket 157 on the shaft 153, the chain running also over a second driving sprocket 158 on the shaft 118, previously referred to.

The traveling pin boxes 136, thirty herein, Fig. 17, comprise successive groups of five boxes each, and of five different lengths, for a reason which will be explained shortly, Fig. 17, the shortest being always the first or right-hand box of the group of five, and they are arranged in groups of five throughout the entire string in the same relation or order to each other, the distinguishing features being, first, the length of each box, the corresponding box of each group being of the same length, and, second, the length of the latch tripping arm, to be described, on each box.

When a pin is delivered from belt 99 (see Fig. 21) to the box 136 which is then in alignment therewith the weight of the pin acts on arm 173a of lever 173 (pivoted at 172) and the other arm 173b of that lever (see Fig. 23) lifts pin 174 thereon and thereby lifts link 175 to bring pin 176 carried thereby behind a pin 144 (herein that on the second preceding box). The chain 131 which carries this link 175 is given a step by step movement (counter-clockwise viewing Fig. 23) by downward movements of arm 129, already referred to, and therefore when the link is positioned as seen in Fig. 23 the chain of boxes is moved to the left one step (viewing Fig. 23) on the next downward movement of arm 129.

Each box is provided on its front end, Figs. 16, 19, with a tripping latch L pivoted by a pin 159 to the box end. Each latch has a weighted horizontal arm 160, of uniform length, and the left-hand end of the arm is notched at 161 and normally rests upon a pin 162 in the box end. On the beam 134, Fig. 16, near its upper edge, are two horizontal rows of latch tripping studs or screws, preferably the latter, and thus adjustable as to length, the first row of five of the screws 166 being lower down than the other group 165, and the effective length of the screws of each group, Fig. 18, being progressively longer from the first to the last, left to right, while the boxes are respectively longer first to last, right to left, Fig. 17, throughout the group. Thus the latch, whether short or long, on each box will always be progressively, left to right, further from the front edge of the stud on the member 134 as its box is shorter. Each box latch, Fig. 16, also has in one group of five boxes a short vertical tripping arm 163 and a long vertical tripping arm 164 in the next group of boxes to cooperate with the latch tripping screws, described.

Reading from left to right, Figs. 16, 17, the short vertical tripping arms 163 of the first five boxes 136a, 136b, 136c, 136d, 136e at the assembly station are not long enough to contact and be tripped by the first and lower group of five latch tripping studs or screws 166, which project forwardly on the beam 134, while the long vertical arms 164 of the next following group of five boxes, like the following group of empty boxes, are longer and extend lower down on the rail beam 134 and cooperate operably with either set of latch tripping screws 165, 166, which, Fig. 18, as stated, are also of varying length in groups of five, the length of the studs or screws increasing progressively left to right, as described.

Thus with the boxes disposed as in Figs. 16, 17, the latch arms 163 of the first five boxes, left to right, will, when moved, pass above the first five tripping screws 166, but the latch arms 164 on the adjacent preceding group of five boxes, and also those of the next and succeeding group to arrive from the left, will contact either the lower set of five screws 166, Figs. 16, 17, or the upper set 165 on the beam 134, as those five boxes travel, left to right, from the position of box 136 and take their positions as boxes 136a, 136b, 136c, etc., to 136k, respectively.

The latch arms 163 of the first five boxes will be tripped, one at a time, simultaneously with one of the latch arms of the second group of boxes, to be explained, and, Fig. 21, the pins therein will be raised at an angle, as each box latch individually contacts the proper screws 165, 166, and the pins will be shunted by a pin shunting board 152, making much less noise than many pin setters, Fig. 21, from the boxes rearwardly into their respective pin conveying chutes 168. Behind each box is an inclined pin conveying chute 168 of light weight, with preferably a larger and stronger lower end 169, leading to the pin dumpers on the pin setting cage, to be described, Fig. 33, which, later, at the proper time, dump each pin into its spotting box 170 in the pin spotting cage or setter 171, Fig. 2, described later.

With the pins distributed in the boxes as shown in Figs. 16, 19, 22, these five pins a, b, c, d, e, reading right to left, in boxes 136a, 136b, 136c, 136d, 136e, left to right, on the first advance movement, see illustrative drawings, Figs. 25-29, by means already described, will move one step to the right, box 136e with pin a moving into the position shown in Fig. 25, and also at the same time short box 136 with long latch 164 and pin f will move one step to the position shown in Fig. 25. Latch 163 on short box 136e will contact the first and shortest screw 165 in the upper row and the long latch 164 on short box 136 with pin f will contact the first screw 166 in the lower row, thus raising the two pins a and f to be shunted together by the board 152, as shown in Fig. 25, dotted lines.

On the next incremental advance of the chain of boxes which takes place when pin h is deposited immediately above disc 148 to displace the arm 173a, no pins are ejected because the depending latch of the box which in Fig. 25 carries pin b misses the left-hand screw 165 when that pin moves to the position of the pin a in that figure. On the succeeding movement of the chain of boxes the latch coming to the position of Fig. 26 will engage the upper short screw 165 which is the second from the left, thus causing the ejection of pin b. Likewise at the left of the figure the latch controlling pin g misses the long screw 166 at the left, but on the second step arrives at the position of Fig. 26 wherein the latch engages the second long screw from the left causing the ejection of pin g simultaneously with pin b.

The next ejection of pins occur when box 136c with pin c has moved two steps to the right, the latch 163 moving beyond the second screw 165 and contacting the third screw 165 in the upper row, and also at the same time a new box with pin h will be brought into the third position from the left, the latch 164 contacting the third screw 166 in the lower row, thus raising the two pins c and h to be shunted by board 152, as shown in Fig. 27.

The next ejection of pins occur when box 136b with pin d has moved two more steps to the right, the latch 163 passing beyond the end of the third screw 165 and contacting the fourth screw 165 in the upper row, and also at the same time the box with pin i will be brought into the fourth position from the left, the latch 164 passing the third screw 165 and contacting the fourth screw 166 in the lower row, thus raising the two pins d and i to be shunted by the board 152, as shown in Fig. 28.

On the next step, the box 136a with pin e will move two more steps to the right, the latch 163 passing beyond the fourth screw 165 and contacting the fifth and last screw in the upper row, and also at the same time a new box with pin j will be brought into the fifth position from the left and latch 164 will contact the fifth and last screw 166 in the lower row, thus raising the two pins e and j to be shunted by the board 152, as shown in Fig. 29.

During this time five new boxes with pins k, l, m, n, o have been brought into the position of boxes 136—136d, ten pins, sufficient for a new set-up, having been shunted by the board 152 into their cage chutes. This action will be continued as long as the machine is in operation.

Thus five pins f, g, h, i, j with their boxes have been brought into the position of the original boxes and taken the place of pins a, b, c, d, e, and when they have been shunted down the chutes five more k, l, m, n, o will take the places of the first five, and the operation will so continue.

*Pin shunting mechanism*

The pin shunting board 152 rotates at regular, timed intervals as described, and only the two pins which have been raised to an angle by the two latches on their boxes, as described, will be contacted by the board 152 and shunted from their boxes.

The preferred manner of loading the boxes with pins to start with is to load the first five boxes as illustrated in Fig. 16.

Thus the pins are shunted into the cage in pairs, diminishing very much the noise and confusion that usually accompanies such proceeding.

The step by step movement of the boxes already referred to is effected in the following manner. On the beam 134a, Figs. 21, 22, there is pivoted by a pin 172 a two-arm lever 173, Fig. 22, the left-hand arm 173a of which normally rests in the rear of the box 136 so that when a pin drops into the box 136 the pin will hit and depress the arm 173a of the lever 173, causing the opposite lever arm 173b, Figs. 22, 23, with a laterally extended pin 174 to rise. When it rises, as seen in Fig. 23, the pin 174 raises one end of an overlying link 175 which is pivoted to chain 131 and the pin 176 extending laterally from the link is moved into the path of travel of the screws 144 on the box bottoms (see Figs. 21, 22, 23) and as the chain is actuated by the arm 129 as already described the string of boxes is advanced one step forward.

In each of the pin cage chutes 168 there is, near the lower end of the chute, Figs. 33, 34, a depending tongue 177 which is hinged to a bar 177a on the top of the chute and acts as a drag against a pin which may come down the chute too fast and to slow up the speed of the pin.

At the lower end of the last chute, seen from the front, Fig. 33, and Figs. 40, 41, there is secured on a bar 178, itself secured to a bar 181 on the frame above the chute, a flexible contact strip of metal 179, one end of which is connected to the operating circuit 26 by line 182, Fig. 54, while a bolt 183 extends through the bar 181 and is connected also to the circuit by line 180, the lower end of the bolt 183, Fig. 41, normally contacting the free end of the contact strip 179.

To cooperate with said strip of metal and circuit, there is, near the lower end of the chute section 169, Fig. 40, a narrow strip of wood 184 hinged above to the chute at 185 to move readily up or down and which is connected with the metallic strip 179 by a wire connecting link 186a. When the strip 184 rests upon a pin, Fig. 41, in the chute it is raised and through the wire 186a raises contact arm 179 into contact with bolt 183, but if no pin passes through that chute, which is the tenth chute, in which it is necessary that there be a pin to complete the full set of ten pins, then the contact strip 184, Fig. 40, will drop low enough to pull the end of strip 179 from the end of bolt 183 and thereby open the operating circuit, and this will prevent the operation of the cage and sweep until a pin has passed into said chute. The foregoing construction is provided to prevent operation of the pin cage and sweep without a full set of pins.

At the lower end of each pin chute, Fig. 33, is a pin dumper 187. The pin dumper 187, Figs. 33, 35, 36, 37, 38, is a short chute section of wood or metal, preferably the latter, hinged at 188 to a lateral bar 189. There are four of these bars 189 (see Fig. 35) one for each transverse row of pins in their normal set up and they extend between laterally located, longitudinal bars 190 one on each side of the cage, which are also connected by bracing bars 189a. Each lateral row of dumpers, Fig. 35, is swingingly carried by a bar 191, Figs. 35, 36, 37, 38, on its under side.

Brackets 192 on the bars 191 are connected by a longitudinal link 193, Figs. 35, 36, 37, 38, 39, which will tip all the dumpers at the same time and dump the pins therein into their proper cage boxes, to be described. On the rear bar 191, Figs. 33, 36, 38, there are fastened two longer brackets 194, 194a, some distance apart, Figs. 33, 38, and to each of these brackets is connected a horizontal link 195, 195a, connected respectively in turn to upright arms 196, 196a, Figs. 42, 43, pivoted at 197 to the longitudinal frame beams 198 which rest on and are secured to transverse frame beams 198a. On the back of each dumper 187, Fig. 38, is a strap 200 which, when the dumper is acting, prevents any following and extra pin in the chute, which sometimes exists, from sliding into the dumper while being tipped. When the shaft 45, Figs. 42, 43, heretofore described is operated, one turn only to raise the sweep, this movement will also operate to lower the cage and operate the dumpers as follows.

Fast on shaft 45, Figs. 39, 42, 43, are two discs 201, 201a, each of which carries on its face a roll 202. When the shaft 45 turns in the direction of the arrow, Figs. 42, 43, these rolls 202 will engage the edges of arms 196, 196a and will swing them into dotted line position, Fig. 35, pulling brackets 194, 194a to the rear, Fig. 36, and through these brackets 194, 194a, brackets 192 and connecting links 193, will tip all dumpers to the position shown in Fig. 36 and drop the pins into the pin cage boxes. To offset the weight of links 195, Fig. 33, are two weights 191a on a bar or strip 191, Figs. 33, 38.

The pin spotting cage C is shown in plan in Fig. 30, and is rectangular in shape. The top frame member 171, Figs. 2, 3, 30, 39, is provided with four upright rods 204, two on the left and two on the right side, extending through bearings 205, 205a on the frame member 190, Figs. 2, 3, to guide the cage perpendicularly in its travel up and down between the pin cage chutes and the pin sweep.

The pin cage member is suspended (see Figs. 2, 3 and 30) by ropes connected at its corners to hooks 206 and 206a the connection at the front being through turnbuckles 207 and 207a which provide an adjustment for levelling the cage. The ropes pass over pulleys 208, then over pulleys 209, 209a to counterweights 210 at the rear of the frame, Figs. 8, 9, to help balance and more easily raise the cage, and the pin cage is thus easily lowered and raised to and from the sweep.

Cam 46 on shaft 45 (Figs. 39, 42 and 43) engages cam roll 50 on the arm 49, to the upper end of which is pivoted rod 51. The other end of rod 51 (toward the right in Fig. 2) is pivoted to a bell crank lever having arms 52 and 54 and pivoted on shaft 53. To the free end of arm 54 is connected a downwardly extending rod 55 which, by the connections shown in Fig. 7 and previously described, operates the sweep in suitably timed relation to the movements of the cage which are also effected from shaft 45 by connections best illustrated in Fig. 3 and hereinafter specifically described.

The pin box, Figs. 44 to 48, has a back 221 beveled at 222, sides 223, and front 224 which is cut away at the top for convenience in receiving the pin, at 225. On two brackets 226, 227 on the front and back respectively of the box are pivoted arms 228 which, at the bottom ends, are fastened at 229 to square bars 230, respectively, the upper arm ends, Fig. 44, resting normally against the bars 189, 189a on the frame of the cage, Figs. 35, 37 and 39. At the ends of each block 230 are pivoted, as seen in Figs. 45 and 44, links 231. These links at their inner ends 232, Figs. 44, 46, carry the rods 233 which, in turn, carry the spool-like pin supporting rolls 234 at the lower end of box 170. Fastened at the lower ends of each box 170, Figs. 46, 48, by screws 235 are plates 236 which are notched at 237 near each end, Fig. 47, to receive the rods 233.

When the rods 233 are not received within the notches 237 and the arm 228 and the parts carried thereby are free to move about the pivots of the former, the center of gravity of the suspended parts is such that the spool-like rolls 234 tend to swing outwardly away from the sides of the box, as indicated in Fig. 46, and when they are in this position the narrow central portions of the rolls (see Fig. 47) are spaced farther apart than the diameter of the bowling pin, which would be free to pass downwardly between the rolls. When, however, the rolls are latched in an inward position, as shown in Fig. 44, with the pins 233 in the notches 237, the rolls will engage the sides of the pin below its point of greatest diameter so as to suspend and support it.

When the cage is lowered toward the alley the head portions of the rolls 234 are brought into contact with the face of the alley. Preferably as hereinafter more fully described, the cage is lowered by a crank motion, which is substantially at dead center as the rolls approach the alley floor, so that the whole cage structure is moving slowly and the rolls gently engage the alley floor instead of striking violently against the same. As the cage continues to descend for a short distance, the rolls are lifted, freeing the pins from the notches 237, and permitting them to move outwardly onto the shoulders 238 in the position of Fig. 46, their outward movement being limited by the stop members 239. As the cage descends, the lower end of the pin will be approximately flush with the threads of the spools. It is thus lowered practically to the floor of the alley with no great distance to fall, and it approaches it with the crank motion hereinafter to be described, moving to a dead center and the cage therefore moving very slowly. The necessary movement of the spools to release their grip on the tapered lower end of the pin is a small fraction of an inch. The pin settles a short distance onto the alley, guided by the spools which roll onto the alley, guided by the spools which roll outwardly freely, along the alley because of their shape, thus preventing catching of the pin, yet having a slight traction effect, which eases the pin into position. Then when the cage retreats the spool-like rolls are farther apart than the maximum diameter of the pin, so that they retreat over it without any contact therewith which might tend to upset it or shift its position. When the cage is returned to its uppermost position, the beveled ends of the arms 228 engage the fixed members 189, 189a in the manner shown in Fig. 44, swinging the arms 228 inwardly, and returning the pins 233 to the position shown in Fig. 44, with the spool-like rollers 234 latched in their inward position.

The control switch 27, described, operating through circuit 26, 182, already described, to raise the sweep 64, lower it, dump the pin dumpers and lower the pin spotting cage C, functions as follows.

The gear 44, Figs. 2a, 49, 50, 51, 52, as previously described, is rotated continuously by chain 43 from sprocket 42 on shaft 41 driven by chain 39 on sprocket 40 from sprocket 38 on main shaft 36. The gear 44 is loose on shaft 45 and has a circular series of holes 240 in its body and is held in position on shaft 45 by a spring 241 seated on bracket 242 fast on said shaft. Adjustably secured on this bracket 242 is a pin 243.

Pivoted to a post 244, at 244a, Fig. 49, on frame member 3a is a lever 245, one end of which, in the form of a yoke 246, engages the hub of gear 44. The forward end of this lever is secured at 247 to any suitable clutch member, herein the core 248 of a solenoid 249 on the beam 3a. This solenoid is energized by current through control switch 27 in circuit 182, 26, already described, and, when energized, the lever 245 is drawn inwardly beneath the latch 250 on post 251, Figs. 50, 52, on beam 3a, and the gear 44 moved toward the pin 243 until it enters one of the holes 240, Fig. 50, described, and thus gear 44 through pin 243 on bracket 242 rotates shaft 45 which, Fig. 2a, by means of a cam 46 thereon, and roll 50 on arm 49 in contact therewith, rod 51 and arm 52, Fig. 2, on shaft 53, and arm 54, rod 55, chain 56, Figs. 6, 7, and arm 59 on shaft 60, as previously described, operates the sweep 64.

As perhaps best seen in Fig. 3 in the rotation of the shaft 45, the crank arms 260 and 260a operating through connecting links 261 and 261a swing rocker arms 263 and 263a (to which they are connected at pivots 262 and 262a) about the points of pivotal support of these rocker arms at 264 and 264a on the beam 3. The cage 171 is suspended by links 265 and 265a from the distal ends of these rocker arms and is therefore raised and lowered. It is apparent from Fig. 3 that the cage reaches its lowermost position substantially at the dead center of the crank so that the rolls 234 are brought gently and slowly into contact with the alley floor as already described. Referring now to Figs. 42 and 43, as the shaft 45 rotates the rollers 282 on the discs 201 and 201a will make contact with the arms 196 and 196a, rocking them about their pivots 197 on the frame members 198 and through the links 195 operating the dumpers to dump the pins into the pin cage boxes 170. As this dumping action occurs the contact 184 (Figs. 40 and 41) is temporarily supported in the circuit closing position of Fig. 41 by the raised rear end of the dumper 187 when the pin (P in Fig. 41) has passed from the dumper and the latter has assumed the raised position of Fig. 36.

During this brief interval, Fig. 37, the guards 200 on the rear ends of the dumpers stop the new supply of pins as they reach the chute ends from entering the boxes. When the dumpers are returned to normal position, Fig. 41, the guards 200 slide down below the forward ends of the pins and the pins coast instantly into the dumpers, one beneath the rod 184, Fig. 41, and it again retains the rod in its normal position, Fig. 41.

On the completion of one revolution of shaft 45 the cam 252 on the shaft contacts the tooth 253 on rod 254, and raises the forward end of rod 254 which, in turn, raises the latch 250, releasing rod 245 so that the spring 241 can slide the gear 44 back on the shaft 45, releasing the pin 243 from its contact with the gear 44 and withdrawing the core 248 from the solenoid.

A pawl 257, Fig. 53, pivoted at 258 on the frame A engages a ratchet 259 fast on the shaft 45 and prevents the shaft from turning backward, and allowing the cage to sag below the loading position.

My invention is not limited to the precise construction shown herein, but may be modified in many details without departing from the spirit of the claims, and within the scope thereof.

I claim:

1. A pin setter comprising a vertically reciprocable frame having pin-receiving boxes to receive the pins in substantially vertical position, pin-supporting and releasing mechanism comprising opposed pin-engaging elements at the bottom of each box consisting of a pair of horizontal spools mounted to permit vertical and lateral displacement, means for latching them together to grip the lower tapered end of a pin, the spools on contact with the alley floor being released from said latch and permitted to roll apart along the floor to release the pin between them, and means cooperating with said mechanism on its return to raised position for returning the parts to latched position.

2. A pin setter comprising a vertically reciprocable frame having pin-receiving boxes adapted to receive pins in substantially vertical position, pin suspending and releasing mechanism comprising members suspended from horizontal axes on opposite sides of each box, inwardly extending arms pivoted to the lower ends of the members and having means at their inner ends for engaging the side of a pin, the center of gravity of the parts suspended from each horizontal axis being such that they tend to lie with said means spaced more widely than the greatest diameter of a pin, upwardly extending and inwardly facing shoulders fixedly associated with the box for retaining the arms in an inward position wherein the engaging means will engage and support a pin, the inner ends of the arms having rollers to contact the alley floor to lift said arms out of engagement with said shoulders and to roll along the floor to permit the separation of the inner ends of said arms by a released pin, and means cooperating with said suspended parts on their return to raised position for relatching them with said engaging means in their inward position.

3. A pin setter comprising a vertically reciprocable frame having pin-receiving boxes adapted to receive pins in substantially vertical position, pin suspending and releasing mechanism comprising members suspended from horizontal axes on opposite sides of each box, inwardly extending arms pivoted to the lower ends of the members and having spool-like members rotatably mounted therebetween, the central portions of which are presented for engaging the sides of a pin, the center of gravity of the parts suspended from each horizontal axis being such that they tend to lie with said portions spaced more widely than the greatest diameter of the pin, upwardly and inwardly facing shoulders fixedly associated with the box for latching said arms in an inward position wherein the engaging means carried thereby will engage and support a pin, the heads of said spool-like members being exposed at the ends of said boxes to engage the alley floor on descent of the frame to unlatch said arms from said shoulders, and means cooperating with said suspended parts on return of the frame to raised position for relatching the arms with said spool-like members in their inward position.

4. A pin setter comprising a vertically reciprocable frame having pin-receiving boxes adapted to receive pins in substantially vertical position, pin suspending and releasing mechanism comprising members suspended from horizontal axes on opposite sides of each box, inwardly extending arms pivoted to the lower ends of the members and having spool-like members rotatably mounted therebetween, the central portions of which are presented for engaging the sides of a pin, the center of gravity of the parts suspended from each horizontal axis being such that they tend to lie with said portions spaced more widely than the greatest diameter of the pin, upwardly and inwardly facing shoulders fixedly associated with the box for latching said arms in an inward position wherein the engaging means carried thereby will engage and support a pin, means effective during the final portion of the down stroke of the frame as it approaches the alley floor to unlatch said arms from engagement with the shoulders, and means cooperating with said suspended parts on return of the frame to raised position for relatching the arms with said spool-like members in their inward position.

5. A pin setter comprising a frame having pin-receiving boxes to receive the pins in substantially vertical position, pin supporting and releasing mechanism comprising opposed pin-engaging elements at the bottom of each box having an inward position engaging the tapered lower end of the pin, a crank mechanism for lowering said frame with the pins therein contained from an elevated position to a lowered position in close proximity to the alley, and means for releasing said elements substantially at the dead point of the crank in the lower position.

6. A pin setter comprising a frame having pin-receiving boxes to receive the pins in substantially vertical position, pin supporting and releasing mechanism comprising opposed pin-engaging elements at the bottom of each box having an inward position engaging the tapered lower end of the pin, a crank mechanism for lowering said frame with the pins therein contained from an elevated position to a lowered position in close proximity to the alley, and means responsive to contact with the alley floor for releasing said elements substantially at the dead point of the crank in the lower position.

7. In a machine of the class described in combination with the setter reciprocating toward and from the alley floor and having boxes for receiving pins in substantially vertical position together with cooperating pin suspending and releasing means, a series of fixed chutes opening to said boxes in the elevated position of the setter, fixed end stop means opposing the ends of the chutes, extensions from the box walls adapted to enter between said stop means and pins opposing the same, means for tilting upwardly the rear ends of the lowermost pins to transfer them to the boxes and cooperating means meanwhile to hold back the following pins.

8. In a machine of the class described in combination with the setter reciprocating toward and from the alley floor and having boxes for receiving pins in substantially vertical position together with cooperating pin suspending and releasing means, a series of fixed chutes each arranged at one side of a box and inclining toward the same so that its lower end opposes the open top of the box in the elevated position of the setter, the boxes having extensions of the walls thereof remote from the chutes to extend across the ends of the chutes, in spaced relation thereto to engage the ends of the lowermost pins in the chutes to hold them back, means for tilting upwardly the rear ends of the lowermost pins to transfer them to the boxes with their leading ends moving downwardly along and in contact with said extensions and means cooperating with said tilting means to hold back the following pins in the chutes while the tilting means is operated.

JOHN F. MURPHY.

REFERENCES CITED

The following references are of record in the file of this patent:

UNITED STATES PATENTS

| Number | Name | Date |
|---|---|---|
| 853,212 | Anderson | May 14, 1907 |
| 1,072,504 | Robinson | Sept. 9, 1913 |
| 1,190,645 | Hedenskoog | July 11, 1916 |
| 1,190,650 | Hedenskoog | July 11, 1916 |
| 1,292,738 | Estabrook | Jan. 28, 1919 |
| 1,375,835 | Fairchild | Apr. 26, 1921 |
| 1,468,212 | Redfield | Sept. 18, 1923 |
| 1,584,030 | Gray | May 11, 1926 |
| 1,692,796 | Bishop | Nov. 20, 1928 |
| 1,736,011 | Olson | Nov. 19, 1929 |
| 1,749,843 | Roark | Mar. 11, 1930 |
| 1,790,641 | Engel | Feb. 3, 1931 |
| 1,852,870 | Williams | Apr. 5, 1932 |
| 1,854,446 | Campbell | Apr. 19, 1932 |
| 1,858,619 | Delamere | May 17, 1932 |
| 1,870,583 | Olson | Aug. 9, 1932 |
| 1,896,383 | White | Feb. 7, 1933 |
| 1,911,436 | Cone | May 30, 1933 |
| 2,017,143 | Bentz | Oct. 15, 1935 |
| 2,316,183 | Patterson | Apr. 13, 1943 |